United States Patent
Berrezag et al.

(10) Patent No.: US 11,784,548 B2
(45) Date of Patent: Oct. 10, 2023

(54) VIBRATING ACTUATOR WITH TWO RESONANT FREQUENCIES AND TWO MOVING PARTS

(71) Applicant: META PLATFORMS, INC., Menlo Park, CA (US)

(72) Inventors: Amir Berrezag, Berlin (DE); Pooya Ghaderi, Montreal (CA); James Mazur, Berlin (DE)

(73) Assignee: META PLATFORMS, INC., Menlo Park, CA (US)

( * ) Notice: Subject to any disclaimer, the term of this patent is extended or adjusted under 35 U.S.C. 154(b) by 428 days.

(21) Appl. No.: 16/810,354

(22) Filed: Mar. 5, 2020

(65) Prior Publication Data

US 2021/0184553 A1 Jun. 17, 2021

Related U.S. Application Data

(63) Continuation-in-part of application No. PCT/EP2019/084641, filed on Dec. 11, 2019.

(51) Int. Cl.
*H02K 33/18* (2006.01)
*H02K 33/12* (2006.01)
(Continued)

(52) U.S. Cl.
CPC ............ *H02K 33/18* (2013.01); *H02K 33/12* (2013.01); *B06B 1/045* (2013.01); *G08B 6/00* (2013.01)

(58) Field of Classification Search
CPC .. H02K 7/1869; H02K 7/1876; H02K 7/1892; H02K 33/18; B06B 1/045
(Continued)

(56) References Cited

U.S. PATENT DOCUMENTS 2,789,177 A * 4/1957 Brockway .............. H01H 50/76
335/93
3,118,022 A 1/1964 Sessler et al.
(Continued)

FOREIGN PATENT DOCUMENTS

| CN | 106095100 A | 11/2016 |
|----|-------------|---------|
| EP | 0580117 | 1/1994 |

(Continued)

OTHER PUBLICATIONS

JPH08335513A English Translation.*
(Continued)

*Primary Examiner* — Maged M Almawri
(74) *Attorney, Agent, or Firm* — Morgan, Lewis & Bockius LLP

(57) ABSTRACT

A vibrating actuator having two different resonant frequencies is disclosed. The vibrating actuator comprises a first moving part 210 having an arrangement of magnets 320. In one embodiment, the arrangement of magnets 320 comprises at least two magnets. The like poles of the magnets 320 face each other and the arrangement of magnets 320 has two outer poles 328. The vibrating actuator has a second moving part 210 having one or more coils 410. The one or more coils 410 are wound over the arrangement of the magnets 320 such that the first moving part 210 can freely slide into the second moving part 220. A chassis 110 is formed by two parts 170, and each part of the chassis 110 is cut to form a first elastic member 150 and a second elastic member 160.

18 Claims, 13 Drawing Sheets

(51) Int. Cl.
*B06B 1/04* (2006.01)
*G08B 6/00* (2006.01)

(58) Field of Classification Search
USPC ........ 310/25, 15, 12.01, 81, 80, 321, 20, 21, 310/28–30, 36–37
See application file for complete search history.

(56) References Cited

U.S. PATENT DOCUMENTS

| | | | | |
|---|---|---|---|---|
| 3,400,316 A * | 9/1968 | Kuschel | ................ | H02K 33/02 327/461 |
| 3,501,745 A * | 3/1970 | Beckman | ................ | H01H 51/32 361/207 |
| 3,602,842 A * | 8/1971 | Smith | ................ | G04C 3/10 318/128 |
| 3,609,419 A * | 9/1971 | Greater | ................ | G04B 17/045 968/126 |
| 4,154,559 A * | 5/1979 | Enomoto | ................ | F04B 45/047 417/413.1 |
| 4,555,682 A * | 11/1985 | Gounji | ................ | H03H 9/562 333/186 |
| 4,639,905 A * | 1/1987 | Goodloe | ................ | G01V 1/155 367/75 |
| 4,697,581 A * | 10/1987 | Endo | ................ | A61H 23/0218 601/78 |
| 5,107,155 A * | 4/1992 | Yamaguchi | ................ | H02K 7/063 340/407.1 |
| 5,111,697 A * | 5/1992 | Habermann | ................ | H02K 33/00 73/668 |
| 5,397,955 A * | 3/1995 | Takagi | ................ | H02N 2/08 310/323.03 |
| 5,543,956 A * | 8/1996 | Nakagawa | ................ | G02B 26/085 359/872 |
| 5,894,263 A | 4/1999 | Shimakawa et al. | | |
| 6,057,554 A * | 5/2000 | Plesko | ................ | H03K 17/955 250/221 |
| 6,218,767 B1 * | 4/2001 | Akada | ................ | H02N 2/0085 310/323.02 |
| 6,413,117 B1 * | 7/2002 | Annerino | ................ | H01R 12/7076 439/500 |
| 6,731,187 B2 * | 5/2004 | Kurihara | ................ | H03H 9/0514 333/192 |
| 7,193,346 B2 * | 3/2007 | Kim | ................ | H02K 7/061 310/81 |
| 7,355,305 B2 * | 4/2008 | Nakamura | ................ | H02K 33/06 310/36 |
| 7,382,510 B2 * | 6/2008 | Yoda | ................ | H02N 1/006 310/309 |
| 7,518,287 B2 * | 4/2009 | Hirasawa | ................ | H01L 41/096 310/323.02 |
| 7,619,498 B2 * | 11/2009 | Miura | ................ | H02K 33/16 310/15 |
| 7,671,493 B2 * | 3/2010 | Takashima | ................ | G06F 3/016 310/15 |
| 7,755,227 B2 * | 7/2010 | Hirashima | ................ | H02K 33/16 310/36 |
| 7,911,098 B2 * | 3/2011 | Lee | ................ | H02K 33/16 310/20 |
| 7,999,421 B2 * | 8/2011 | Kim | ................ | H02K 33/18 310/15 |
| 8,222,782 B2 * | 7/2012 | Saito | ................ | H02K 7/063 310/68 B |
| 8,237,314 B2 * | 8/2012 | Lee | ................ | H02K 33/18 310/15 |
| 8,269,379 B2 * | 9/2012 | Dong | ................ | H02K 33/16 310/28 |
| 8,278,786 B2 * | 10/2012 | Woo | ................ | H02K 33/16 310/15 |
| 8,288,898 B2 * | 10/2012 | Jun | ................ | H02K 33/16 310/34 |
| 8,400,027 B2 * | 3/2013 | Dong | ................ | H02K 33/16 310/25 |
| 8,427,016 B2 * | 4/2013 | So | ................ | H02K 33/16 310/23 |
| 8,461,969 B2 * | 6/2013 | An | ................ | H02K 33/06 318/132 |
| 8,492,938 B2 * | 7/2013 | Park | ................ | H02K 33/18 310/25 |
| 8,587,162 B2 * | 11/2013 | Kagami | ................ | A61C 17/32 310/38 |
| 8,624,449 B2 * | 1/2014 | Kim | ................ | H02K 33/16 310/28 |
| 8,624,450 B2 * | 1/2014 | Dong | ................ | H02K 33/16 310/20 |
| 8,643,229 B2 * | 2/2014 | Park | ................ | H02K 33/16 310/15 |
| 8,648,502 B2 * | 2/2014 | Park | ................ | H02K 33/16 310/15 |
| 8,749,113 B2 * | 6/2014 | Masunaga | ................ | H02N 1/006 310/40 MM |
| 8,766,494 B2 * | 7/2014 | Park | ................ | H02K 35/02 310/25 |
| 8,829,741 B2 * | 9/2014 | Park | ................ | B06B 1/045 310/25 |
| 8,836,189 B2 * | 9/2014 | Lee | ................ | H02K 7/085 310/90 |
| 8,878,401 B2 * | 11/2014 | Lee | ................ | H02K 33/16 310/15 |
| 8,941,272 B2 * | 1/2015 | Hong | ................ | H02K 33/18 310/15 |
| D726,795 S * | 4/2015 | Huang | ................ | D15/147 |
| 9,024,489 B2 * | 5/2015 | Akanuma | ................ | H02K 33/16 310/15 |
| 9,048,718 B2 * | 6/2015 | Zhang | ................ | H02K 33/18 |
| 9,225,265 B2 * | 12/2015 | Oh | ................ | H02N 2/001 |
| 9,252,648 B2 * | 2/2016 | Furukawa | ................ | H02K 7/1876 |
| 9,306,429 B2 * | 4/2016 | Akanuma | ................ | H02K 33/16 |
| 9,312,744 B2 * | 4/2016 | Akanuma | ................ | B06B 1/045 |
| 9,350,220 B2 * | 5/2016 | Kuroda | ................ | H02K 33/16 |
| 9,467,033 B2 * | 10/2016 | Jun | ................ | H02K 33/16 |
| 9,543,816 B2 * | 1/2017 | Nakamura | ................ | H02K 33/16 |
| 9,553,497 B2 * | 1/2017 | Kim | ................ | B06B 1/045 |
| 9,614,425 B2 * | 4/2017 | Jin | ................ | H02K 33/12 |
| 9,748,827 B2 * | 8/2017 | Dong | ................ | H02K 33/16 |
| 9,762,110 B2 * | 9/2017 | Wang | ................ | H02K 33/16 |
| 9,831,415 B2 * | 11/2017 | Park | ................ | B06B 1/0648 |
| 9,871,432 B2 * | 1/2018 | Mao | ................ | H02K 33/16 |
| 9,948,170 B2 * | 4/2018 | Jun | ................ | H02K 33/00 |
| 9,958,945 B1 * | 5/2018 | Liu | ................ | H02N 2/02 |
| 9,966,827 B2 * | 5/2018 | Wang | ................ | H02K 33/16 |
| 10,008,894 B2 * | 6/2018 | Mao | ................ | H02K 1/34 |
| 10,033,257 B2 * | 7/2018 | Zhang | ................ | H02K 33/12 |
| 10,063,128 B2 * | 8/2018 | Wang | ................ | H02K 33/16 |
| 10,160,010 B2 * | 12/2018 | Chun | ................ | H02K 33/16 |
| 10,307,791 B2 * | 6/2019 | Xu | ................ | B06B 1/045 |
| 10,328,461 B2 * | 6/2019 | Xu | ................ | B06B 1/045 |
| 10,483,451 B2 * | 11/2019 | Wang | ................ | H01L 41/04 |
| 10,486,196 B2 * | 11/2019 | Chai | ................ | B06B 1/045 |
| 10,491,090 B2 * | 11/2019 | Zu | ................ | H02K 33/16 |
| 10,596,596 B2 * | 3/2020 | Ling | ................ | B06B 1/045 |
| 10,674,278 B2 * | 6/2020 | Zhou | ................ | H04R 9/025 |
| 10,763,732 B2 * | 9/2020 | Liu | ................ | H02K 33/18 |
| 10,886,827 B2 * | 1/2021 | Liu | ................ | H02K 33/14 |
| 11,050,334 B2 * | 6/2021 | Mori | ................ | H02K 33/18 |
| 2002/0109424 A1 * | 8/2002 | Iwabuchi | ................ | H04R 9/06 310/81 |
| 2003/0094861 A1 * | 5/2003 | Shimizu | ................ | H02K 33/10 310/36 |
| 2004/0169425 A1 * | 9/2004 | Aihara | ................ | B06B 1/045 310/15 |
| 2006/0002577 A1 * | 1/2006 | Won | ................ | B06B 1/045 381/396 |
| 2006/0066164 A1 * | 3/2006 | Kim | ................ | H02K 7/063 310/81 |
| 2007/0216235 A1 * | 9/2007 | Lee | ................ | H02K 33/16 310/15 |
| 2008/0129130 A1 * | 6/2008 | Mun | ................ | H02K 5/225 310/40 MM |

(56) References Cited

U.S. PATENT DOCUMENTS

| | | | |
|---|---|---|---|
| 2009/0036807 A1* | 2/2009 | Habatjou | A61H 23/0263 601/134 |
| 2009/0096299 A1* | 4/2009 | Ota | B06B 1/045 310/25 |
| 2009/0243410 A1* | 10/2009 | Kleibl | B06B 1/166 405/232 |
| 2009/0267423 A1* | 10/2009 | Kajiwara | H02K 33/02 310/38 |
| 2010/0213773 A1* | 8/2010 | Dong | H02K 33/16 310/25 |
| 2010/0289357 A1* | 11/2010 | An | H02K 5/1677 310/81 |
| 2010/0302752 A1* | 12/2010 | An | H02K 33/06 361/807 |
| 2011/0006618 A1* | 1/2011 | Lee | B06B 1/045 310/25 |
| 2011/0018364 A1* | 1/2011 | Kim | H02K 33/18 310/20 |
| 2011/0018367 A1* | 1/2011 | Kim | B06B 1/045 310/25 |
| 2011/0062803 A1* | 3/2011 | Lee | H02K 33/18 310/29 |
| 2011/0068640 A1* | 3/2011 | Choi | H02K 5/04 310/25 |
| 2011/0074228 A1* | 3/2011 | Kim | H02K 33/16 310/29 |
| 2011/0074229 A1* | 3/2011 | Kim | H02K 15/14 310/29 |
| 2011/0089772 A1* | 4/2011 | Dong | H02K 33/16 310/25 |
| 2011/0101797 A1* | 5/2011 | Lee | H02K 33/16 310/29 |
| 2011/0101798 A1* | 5/2011 | Lee | H02K 33/16 310/29 |
| 2011/0115310 A1* | 5/2011 | Dong | H02K 33/16 310/28 |
| 2011/0115311 A1* | 5/2011 | Dong | H02K 33/16 310/28 |
| 2011/0127858 A1* | 6/2011 | Park | B06B 1/045 310/25 |
| 2011/0133577 A1* | 6/2011 | Lee | H02K 33/18 310/15 |
| 2011/0156500 A1* | 6/2011 | Dong | H02K 33/16 310/25 |
| 2011/0169347 A1* | 7/2011 | Miyamoto | G06F 3/016 310/12.21 |
| 2011/0198945 A1* | 8/2011 | Nakagawa | H02K 33/16 310/12.25 |
| 2011/0203061 A1* | 8/2011 | Takahashi | H02K 33/18 310/38 |
| 2011/0227426 A1* | 9/2011 | Lee | H02K 33/18 310/25 |
| 2011/0241451 A1* | 10/2011 | Park | B06B 1/045 310/25 |
| 2011/0254782 A1* | 10/2011 | Park | B06B 1/045 345/173 |
| 2011/0260560 A1* | 10/2011 | Park | H02K 33/16 310/25 |
| 2011/0266892 A1* | 11/2011 | Wauke | H02K 33/18 310/25 |
| 2011/0278960 A1* | 11/2011 | Jeon | B06B 1/045 310/25 |
| 2011/0309691 A1* | 12/2011 | Park | H02K 33/16 310/25 |
| 2011/0316361 A1* | 12/2011 | Park | H02K 33/16 310/25 |
| 2012/0032535 A1* | 2/2012 | Park | H02K 35/02 310/25 |
| 2012/0049660 A1* | 3/2012 | Park | B06B 1/045 310/25 |
| 2012/0104875 A1* | 5/2012 | Park | H02K 33/16 310/25 |
| 2012/0108299 A1* | 5/2012 | Yang | H02K 33/16 455/567 |
| 2012/0112565 A1* | 5/2012 | Lee | H02K 33/16 310/20 |
| 2012/0153748 A1* | 6/2012 | Wauke | H02K 33/16 310/25 |
| 2012/0169148 A1* | 7/2012 | Kim | H02K 33/16 310/25 |
| 2012/0169151 A1* | 7/2012 | Dong | H02K 33/16 310/25 |
| 2012/0170792 A1* | 7/2012 | Li | H04R 9/066 381/412 |
| 2012/0187780 A1* | 7/2012 | Bang | H02K 33/16 310/25 |
| 2012/0313459 A1* | 12/2012 | Zhang | H02K 33/18 310/25 |
| 2012/0319506 A1* | 12/2012 | Shim | H02K 33/16 310/25 |
| 2013/0099600 A1* | 4/2013 | Park | B06B 1/045 310/15 |
| 2013/0099602 A1* | 4/2013 | Park | H02K 33/16 310/25 |
| 2013/0119787 A1* | 5/2013 | Yu | B06B 1/045 310/25 |
| 2013/0134804 A1* | 5/2013 | Kim | B06B 1/045 310/25 |
| 2013/0169072 A1* | 7/2013 | Oh | H02K 33/16 310/36 |
| 2013/0229070 A1* | 9/2013 | Akanuma | H02K 33/00 310/25 |
| 2013/0241321 A1* | 9/2013 | Akanuma | B06B 1/045 310/25 |
| 2014/0062224 A1* | 3/2014 | Kim | H02K 33/16 310/15 |
| 2014/0070667 A1* | 3/2014 | Oh | G06F 3/016 310/329 |
| 2014/0152126 A1* | 6/2014 | Kim | B06B 1/045 310/25 |
| 2014/0152148 A1* | 6/2014 | Oh | B06B 1/0648 310/321 |
| 2014/0219494 A1* | 8/2014 | Kim | H04R 9/046 381/400 |
| 2014/0285064 A1* | 9/2014 | Kim | H01L 41/053 310/317 |
| 2014/0306556 A1* | 10/2014 | Kim | H02K 33/16 310/25 |
| 2014/0346924 A1* | 11/2014 | Son | H01L 41/0933 310/317 |
| 2014/0346926 A1* | 11/2014 | Choi | H01L 41/0933 310/323.01 |
| 2015/0015117 A1* | 1/2015 | Lee | B06B 1/04 310/20 |
| 2015/0070792 A1* | 3/2015 | Terajima | G02B 7/08 359/824 |
| 2015/0086066 A1* | 3/2015 | Yan | H04R 9/025 381/412 |
| 2015/0123498 A1* | 5/2015 | Yang | H02K 33/16 310/25 |
| 2015/0137627 A1* | 5/2015 | Katada | H02K 33/16 310/25 |
| 2015/0181344 A1* | 6/2015 | Jiang | H04R 31/006 381/400 |
| 2015/0194870 A1* | 7/2015 | Kim | H02K 33/18 310/25 |
| 2015/0236240 A1* | 8/2015 | Park | H01L 41/23 29/25.35 |
| 2015/0328664 A1* | 11/2015 | Kim | B06B 1/0644 310/323.01 |
| 2015/0333699 A1* | 11/2015 | Kim | H03B 5/32 345/173 |
| 2016/0173990 A1* | 6/2016 | Park | H04R 9/043 381/354 |
| 2016/0192075 A1* | 6/2016 | Shibata | H02K 33/18 310/28 |
| 2016/0198262 A1* | 7/2016 | Wang | H04R 7/18 381/392 |

(56) References Cited

U.S. PATENT DOCUMENTS

| | | | |
|---|---|---|---|
| 2016/0218607 A1* | 7/2016 | Oh | H02K 33/16 |
| 2016/0254736 A1* | 9/2016 | Jin | H02K 33/16 310/25 |
| 2016/0336842 A1* | 11/2016 | Chun | H02K 33/16 |
| 2016/0381462 A1* | 12/2016 | Wang | H04R 9/06 381/400 |
| 2017/0012517 A1* | 1/2017 | Huang | H02K 33/00 |
| 2017/0019008 A1* | 1/2017 | Berrezag | B06B 1/045 |
| 2017/0033653 A1* | 2/2017 | Wang | H02K 33/16 |
| 2017/0033654 A1* | 2/2017 | Wang | H02K 33/16 |
| 2017/0033657 A1* | 2/2017 | Mao | H02K 33/16 |
| 2017/0033664 A1* | 2/2017 | Xu | H02K 33/18 |
| 2017/0110920 A1* | 4/2017 | Mao | H02K 1/34 |
| 2017/0110950 A1* | 4/2017 | Akanuma | H02K 33/00 |
| 2017/0214306 A1* | 7/2017 | Katada | H02K 33/16 |
| 2017/0222535 A1* | 8/2017 | Baek | H02K 11/30 |
| 2017/0250596 A1* | 8/2017 | Son | H02K 1/34 |
| 2017/0288519 A1* | 10/2017 | Kim | H02K 33/00 |
| 2018/0021812 A1* | 1/2018 | Akanuma | H02K 33/00 310/25 |
| 2018/0278137 A1 | 9/2018 | Zhu et al. | |
| 2018/0297077 A1* | 10/2018 | Chai | B06B 1/045 |

FOREIGN PATENT DOCUMENTS

| | | | |
|---|---|---|---|
| JP | H08335513 A | | 12/1996 |
| JP | H08335513 A | * | 1/2015 |
| KR | 101389416 B1 | * | 4/2014 |
| WO | 2018079251 A1 | | 3/2018 |

OTHER PUBLICATIONS

KR101389416B1 English Translation.*
International Search Report and Written Opinion prepared by the European Patent Office for PCT/EP2019/084641, dated Jul. 6, 2020, 14 pages.

* cited by examiner

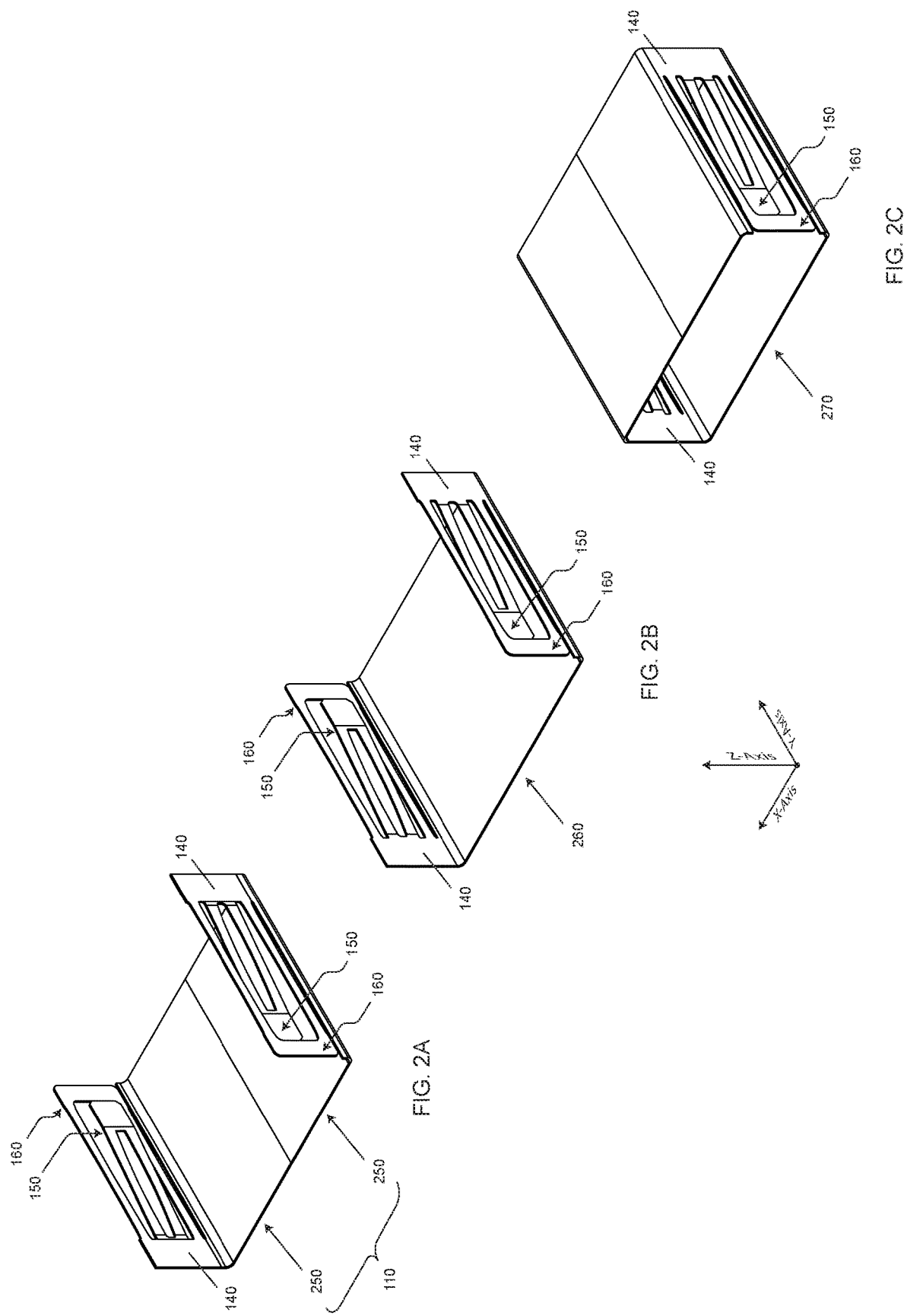

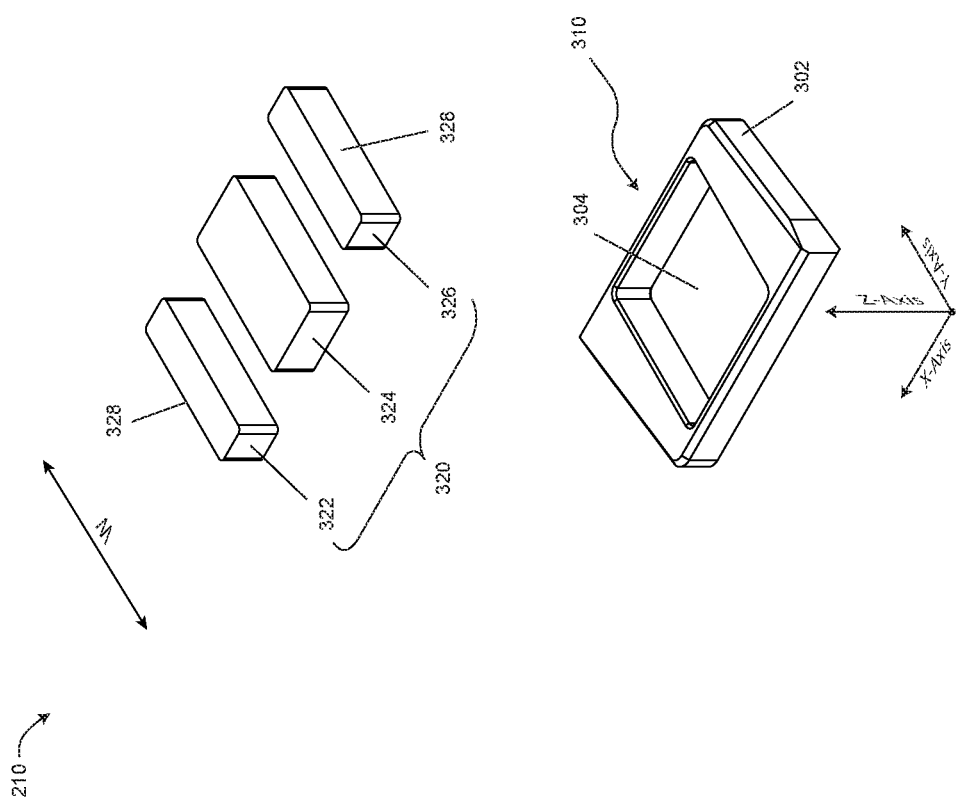

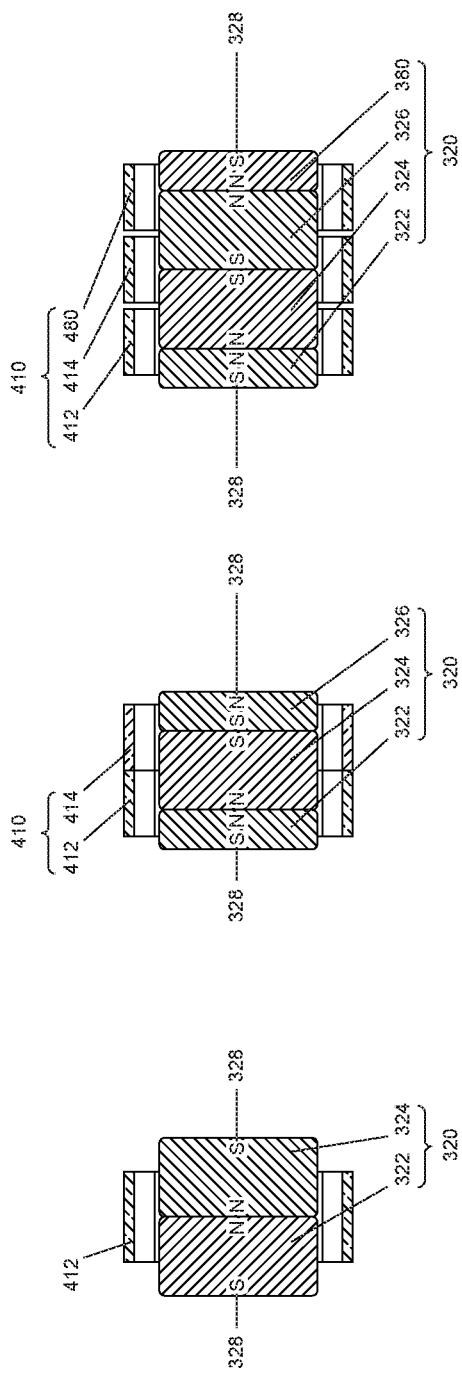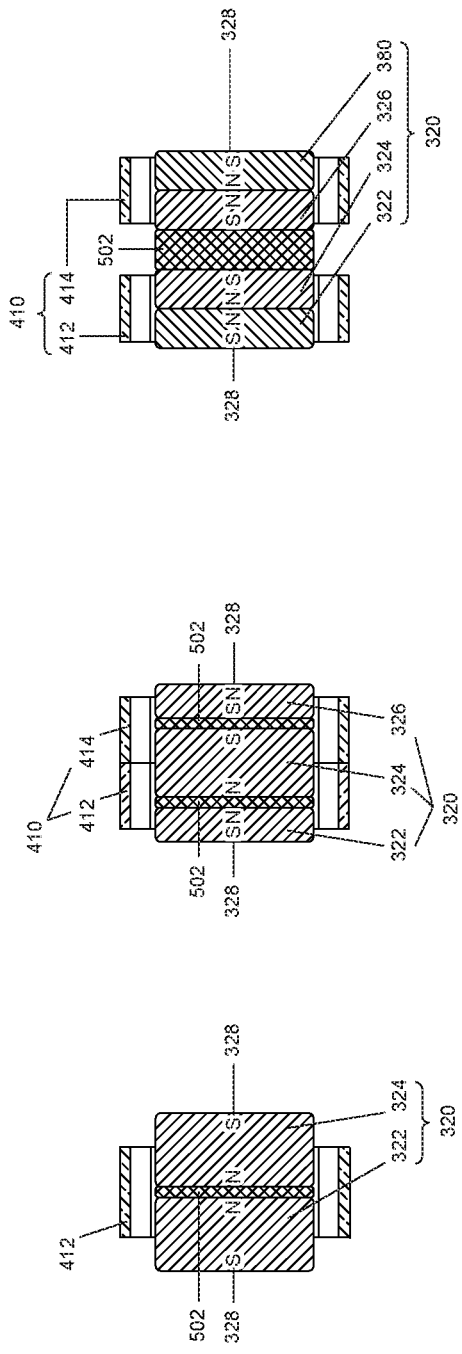

VIBRATING ACTUATOR WITH TWO RESONANT FREQUENCIES AND TWO MOVING PARTS

FIELD OF THE INVENTION

The present invention is directed to a novel vibrating actuator for a variety of applications, for example, a miniature vibro-tactile actuator having multiple resonant frequencies. More specifically, the novel vibrating actuator provides high-definition haptic output for immersive experiences for video, gaming and music and other immersive experiences.

BACKGROUND OF THE INVENTION

The majority of music we traditionally listen to can be regarded as complex signals resulting from the addition of several signals, e.g. mixed music signals of multiple instruments or voices. The same is also true for audio signals associated with gaming or video content, where not only mixed music signals can be present, but also other complex signals such as sound effects and additional voices. With the possibility of electronically recording and reproducing sound, in particular complex music or audio associated with gaming or video signals, a further aspect becomes important, namely the conversion of electrical signals to sound waves which are perceived by the listener when the sound is reproduced. In order to reduce distortion problems during reproduction, U.S. Pat. No. 3,118,022 discloses an electroacoustic transducer comprising two conductive members, a diaphragm which includes electrets and conductive materials and which is supported between the two conductive members, and a mechanism for electrically connecting to said diaphragm and the two conductive members.

On the other hand, the coupled perception of sound and vibration is a well-known phenomenon. Sound is a mechanical wave that propagates through compressible media such as gas (air-borne sound) or solids (structure-borne sound), wherein the acoustic energy is transported via vibrating molecules and received by the vibrating hair cells in the listener's cochlea. Vibration, on the other hand, is a mechanical stimulus which excites small or large parts of the perceiver's body through a contact surface. The coupled perception of sound and vibration is based on the fact that the human brain receives sound not only through the ears, but also through the skeleton—measurements in a concert hall or church confirm the existence of whole-body vibrations. The body perception of low frequencies is particularly important for an immersive experience of live music, any music sensation that is desired to be pleasurable or audio associated with video games, or movies.

Accordingly, high-definition haptic feedback could be used to create immersive experiences for video, gaming and music and other immersive experiences where the vibration is coupled to continuous audible (or visual) signals. Major requirements for a device to achieve continuous high-definition haptic feedback are:

1. large frequency range, ideally from 20 to 1000 Hz, to be able to generate good quality vibrations over this range, in particular, for music;
2. heavy moving mass, for effective acceleration;
3. small, especially flat, size to make the device portable or wearable;
4. high power efficiency to enable uninterrupted use;
5. silent vibration to avoid disturbance of the sound experience;
6. steady performance to enable continuous use;
7. cost efficient manufacturing to provide an affordable device.

Vibrotactile voice-coil or moving magnet-type actuators are normally used in industrial applications and use a voice coil or moving magnet-type actuator consisting of two parts, one of which is moving and one of which is stationary, wherein the two parts are interconnected by an elastic attachment. The vibration is generated by the interaction of a movable permanent magnet and a stationary coil surrounding it, wherein, due to the Laplace Force, an alternating current passing through the coil interacts with the magnetic field of the magnet and generates a mechanical force with changing direction on the magnet—this results in a linear movement of the magnet with changing direction, causing the vibration. However, standard linear resonant actuators only have a very narrow frequency range which makes them unsuitable for many uses including enhanced sound experience.

EP 0580117A2 discloses such a moving magnet-type actuator for industrial use in control equipment, electronic equipment, machine tools and the like. In order to improve the performance of the actuator, the stationary part comprises at least three coils and the moving part comprises at least two permanent magnets arranged with same poles facing each other such that the magnetic flux is used more effectively because a highly concentrated magnetic field is created in the plane between the magnets. The elastic attachment interconnecting the magnets and the coils consists in compression springs. However, the magnetic field lines, once they have crossed the surrounding coils, are lost and not guided back to the magnets which results in waste of potential magnetic field. Furthermore, like all industrial vibrators, this actuator is noisy which makes it unsuitable for many uses including enhanced sound experience and, in particular, music.

US 20110266892 discloses a vibration generation device for producing vibration frequencies. The vibration generation device comprises a first vibrator and a second vibrator. The first vibrator is formed by a pair of magnets and a coil, which are placed in a first elastic support members to produce the first vibration. The second vibrator is capable of freely vibrating in the magnetic field formed by the magnets and the magnetic field generated by the coil. The second vibrator has another elastic member for supporting the vibration of the second vibrator. However, the assembly of the first vibrator is contained within the second vibrator and the first elastic member operates within the assembly of the other elastic member thereby restricting the vibration of the first vibrator.

US 20180278137 discloses a vibrating motor with a housing, a stator, a vibrator and an elastic support member. The vibrator includes a mass block and magnets. The stator includes a first coil with a first fixing board and a second coil with a second fixing board. The first and second coils are located on opposite sides of the mass block. The linear vibrating motor reduces loss of the magnetic field, which makes it more efficient, while implementing vibration feedback. However, the linear vibrating motor only operates at one resonant frequency.

WO 2018079251 discloses another type of vibrating motor that requires less space and provides good responsiveness. The linear vibrating motor includes a mover with weights, which are affixed on the longitudinal end side of a pair of long magnets. A coil fixed to a base has a long shape in the longitudinal direction of the pair of magnets. When an electric current is passed through the coil, it drives and reciprocates the mover in the transverse direction to generate vibration. However, the vibrating motor only operates at one resonant frequency.

There is still a need for a vibrating actuator that is efficient at producing a high definition haptic output for enhanced wide band frequency response. Additionally, this vibrating actuator can overcome the deficiencies of the prior art to create immersive haptic experiences for audio associated with video, gaming and music by satisfying the requirements mentioned above.

SUMMARY OF THE INVENTION

A vibrating actuator having two different resonant frequencies is disclosed. The vibrating actuator comprises a chassis 110, a first moving part 210 and a second moving part 220. The first moving part 210 has an arrangement of magnets 320 and a frame 310. The arrangement of magnets 320 has a pair of outer poles 328. The second moving part 220 includes two U-shaped brackets 420 and at least one coil 410. The at least one coil 410 is wound over the arrangement of magnets 320 such that the first moving part 210 slides into the second moving part 220. The chassis 110 comprises two parts 170; each of the two parts 170 of the chassis 110 is cut to form a first elastic member 150 and a second elastic member 160. The first moving part 210 is attached to the first elastic member 150 and the second moving part 220 is attached to the second elastic member 160 such that each of the outer poles 328 of the arrangement of magnets 320 faces the first elastic member 150 and the second elastic member 160 of each of the two parts 170 of the chassis 110. In addition, the two parts 170 of the chassis 110 are disposed diagonally opposite to each other such that the first elastic member 150 and the second elastic member 160 point in the opposite direction. The two parts 170 of the chassis 110 mate with each other to form a rectangular parallelepiped structure.

In one embodiment, each of the two parts 170 of the chassis 110 is U-shaped. Alternatively, each of the two parts 170 of the chassis 110 is L-shaped. In another embodiment, the chassis 110 is formed by one part, which is U-shaped or O-shaped. When each of the two parts 170 of the chassis 110 is U-shaped, the two parts 170 of the chassis 110 includes an upper plate 120, a lower plate 130, and a lateral plate 140. The lateral plate 140 has the first elastic member 150 and the second elastic member 160 cut from the lateral plate 140 on each of the two parts 170 of the chassis 110.

The first elastic member 150 and the second elastic member 160 are U-shaped and are arranged on each of the two parts 170 of the chassis 110 such that the second elastic member 160 surrounds the first elastic member 150 on three sides and the first elastic member 150 and the second elastic member 160 terminate into the lateral plate 140 on the fourth side. The first elastic member 150 on each of the two parts 170 of the chassis 110 is formed by a rectangular plate 704 and two legs 702. The two legs 702 have transversal indentations either on an inner edge 716 and/or an outer edge 718 or on both the inner edge 716 and the outer edge 718. Alternatively, either one or both the inner edge 716 and/or the outer edge 718 has straight edges. Similarly, the second elastic member 160 on each of the two parts 170 of the chassis 110 is formed by a rectangular plate 708 and two legs 706. The two legs 706 have transversal indentations either on an inner edge 720 and/or an outer edge 722 or on both the inner edge 720 and the outer edge 722. Alternatively, either one or both the inner edge 720 or the outer edge 722 has straight edges.

In one variation, the rectangular plate 708 of the second elastic member 160 is affixed to a L-shaped part 1204 to form a holder 1202. The holder 1202 has a provision to secure the second moving part 220 comprising one or more coils 410.

In one embodiment, the first moving part 210 includes the arrangement of magnets 320 having at least two magnets, a first magnet 322 and a second magnet 324. In an alternate implementation, the first moving part 210 includes the arrangement of magnets 320 having at least two magnets, the first magnet 322 and the second magnet 324 with a spacer 502 placed in between the first magnet 322 and the second magnet 324.

In another embodiment, the first moving part 210 includes the arrangement of magnets 320 having three magnets, the first magnet 322, the second magnet 324, and a third magnet 326. In an alternate implementation, the first moving part 210 includes the arrangement of magnets 320 having three magnets, the first magnet 322, the second magnet 324, and the third magnet 326 with the spacer 502 provided in between the two adjacent magnets, wherein the like poles of the two adjacent magnets face each other.

In embodiments, the spacer 502 can be a non-magnetic material or a paramagnetic material.

In one embodiment, the first moving part 210 includes a frame. The arrangement of magnets 320 is held together with a glue and placed within the frame 310. In another embodiment, the arrangement of magnets 320 is held together with the glue without the frame 310. In another embodiment, the arrangement of magnets 320 has the spacer 502 placed in between the adjacent magnets, wherein the spacer and the magnets are held together with the glue without the frame 310.

In one embodiment, only one coil 412 is provided. In another embodiment, a first coil 412 and a second coil 414 are provided. In yet another embodiment, the at least one coil 410 comprises more than two coils.

In one embodiment, the second moving part 220 includes U-shaped brackets 420 and the at least one coil 410. In another embodiment, the second moving part 220 includes only at least one coil 410 without U-shaped brackets 420.

In an embodiment, the upper plate 120 and the lower plate 130 of the chassis 110 have attachment means 904 for attaching guiding magnets 902. The attachment means 904 are tabs. In another embodiment, the attachment means 904 are clamps, clips or holding brackets.

In an embodiment where the arrangement of magnets comprises two magnets 322, 324, a pair of guiding magnets 902 are provided. The guiding magnets 902 are placed on opposite sides and affixed with attachment means 904 such that the transversal center line of each of the guiding magnets 902 is longitudinally aligned with the transversal center line of the spacer 502 placed in between the arrangement of magnets 320.

In an embodiment, when the arrangement of magnets 320 has the spacer 502 provided in between adjacent magnets, the guiding magnets 902 are placed on each of the upper plate 120 and the lower plate 130 on opposite sides on each of the two parts 170 and affixed with attachment means 904 such that the transversal center line of the guiding magnets 902 is longitudinally aligned with the transversal center line of the spacer 502 placed in between the arrangement of magnets 320.

In another embodiment, when the arrangement of magnets 320 does not include the spacer 502 between adjacent magnets, the guiding magnets 902 are placed on each of the upper plate 120 and the lower plate 130 on the opposite sides on each of the two parts 170 and affixed with the attachment means 904 such that the transversal center line of the guiding magnets 902 is longitudinally aligned with the transversal intersection line of the first magnet 322 and the second magnet 324 of the arrangement of magnets 320.

Alternatively in another embodiment, the guiding magnets 902 are placed on each of the upper plate 120 and the lower plate 130 on the opposite sides on each of the two parts 170 and affixed with the attachment means 904 such that the transversal center line of the guiding magnets 902 is longitudinally offset by 0.2 mm to 1 mm from the transversal center line of the spacer 502 or the transversal intersection line of the first magnet 322 and the second magnet 324 of the arrangement of magnets 320.

In another embodiment, where the arrangement of magnets 320 comprises more than two magnets, more pairs of guiding magnets 902 are provided such that, if the arrangement of magnets 320 comprises n magnets, n−1 pairs of guiding magnets 902 are provided.

In one embodiment, the arrangement of magnets 320 and the at least one coil 410 are aligned such that the transversal intersection line of the two adjacent magnets longitudinally coincides with the longitudinal center of the at least one coil 410. In an alternate embodiment, the arrangement of magnets 320 and the at least one coil 410 are aligned such that the transversal intersection line of the two adjacent magnets is longitudinally offset by 0.25 mm to 2 mm from the longitudinal center of the at least one coil 410. In one implementation, when the arrangement of magnets 320 includes the first magnet 322 and the second magnet 324, the transversal intersection line longitudinally coincides with the longitudinal center of the coil 412. Alternatively, in another implementation of the embodiment, when the arrangement of magnets 320 includes the first magnet 322 and the second magnet 324, the transversal intersection line of the adjacent magnets is longitudinally offset by 0.25 mm to 2 mm from the longitudinal center of the coil 412.

A method for manufacturing a vibrating actuator is disclosed. The method of manufacturing includes assembling a first moving part 210 having an arrangement of magnets 320 comprising at least two magnets, that is, the first magnet 322 and the second magnet 324 with like poles of the adjacent magnets facing each other. The arrangement of magnets 320 has two outer poles 328, which face towards the first elastic member 150 and the second elastic member 160. Further, the method of manufacturing includes a second moving part 220 having the at least one coil 410 such that the at least one coil 410 is wound over the arrangement of magnets 320. In one embodiment, when there are only two magnets in the arrangement of magnets 320, there is only one coil 412. In another embodiment, when there are only two magnets in the arrangement of magnets 320 and there is only one coil 412, the arrangement of magnets 320 has the spacer 502 in between the adjacent magnets. In another embodiment, there are only two magnets in the arrangement of magnets 320 with the spacer 502 provided in between the adjacent magnets and one coil 412, then a pair of guiding magnets 902 are provided for directing the magnetic field lines of the arrangement of magnets 320. A chassis 110 is formed by two parts 170. Each of the two parts 170 of the chassis 110 is cut to form a first elastic member 150 and a second elastic member 160. The two parts 170 of the chassis 110 are arranged such that the first elastic member 150 and the second elastic member 160 of each of the two parts 170 of the chassis point in the opposite direction and the first elastic member 150 and the second elastic member 160 face one of the two outer poles 328 of the arrangement of magnets 320. Each first elastic member 150 of each of the two parts 170 is attached to the first moving part 210 and each second elastic member 160 of each of the two parts 170 is attached to the second moving part 220. The two parts 170 of the chassis 110 are assembled to form a rectangular parallelepiped structure of the vibrating actuator.

BRIEF DESCRIPTION OF THE SEVERAL VIEWS OF THE DRAWINGS

FIG. 2A-2C illustrate different variations of the chassis;

FIG. 3 illustrates the first moving part of the vibrating actuator;

FIG. 5A-5C illustrate different configurations of an arrangement of magnets and coils;

FIG. 5D-5F illustrate different configurations of the arrangement of magnets, with spacers provided between adjacent magnets and coils;

FIG. 7, FIG. 7A, FIG. 7B and FIG. 7C illustrate different variations of the first elastic member and the second elastic member;

DETAILED DESCRIPTION OF THE INVENTION

Figure 1:
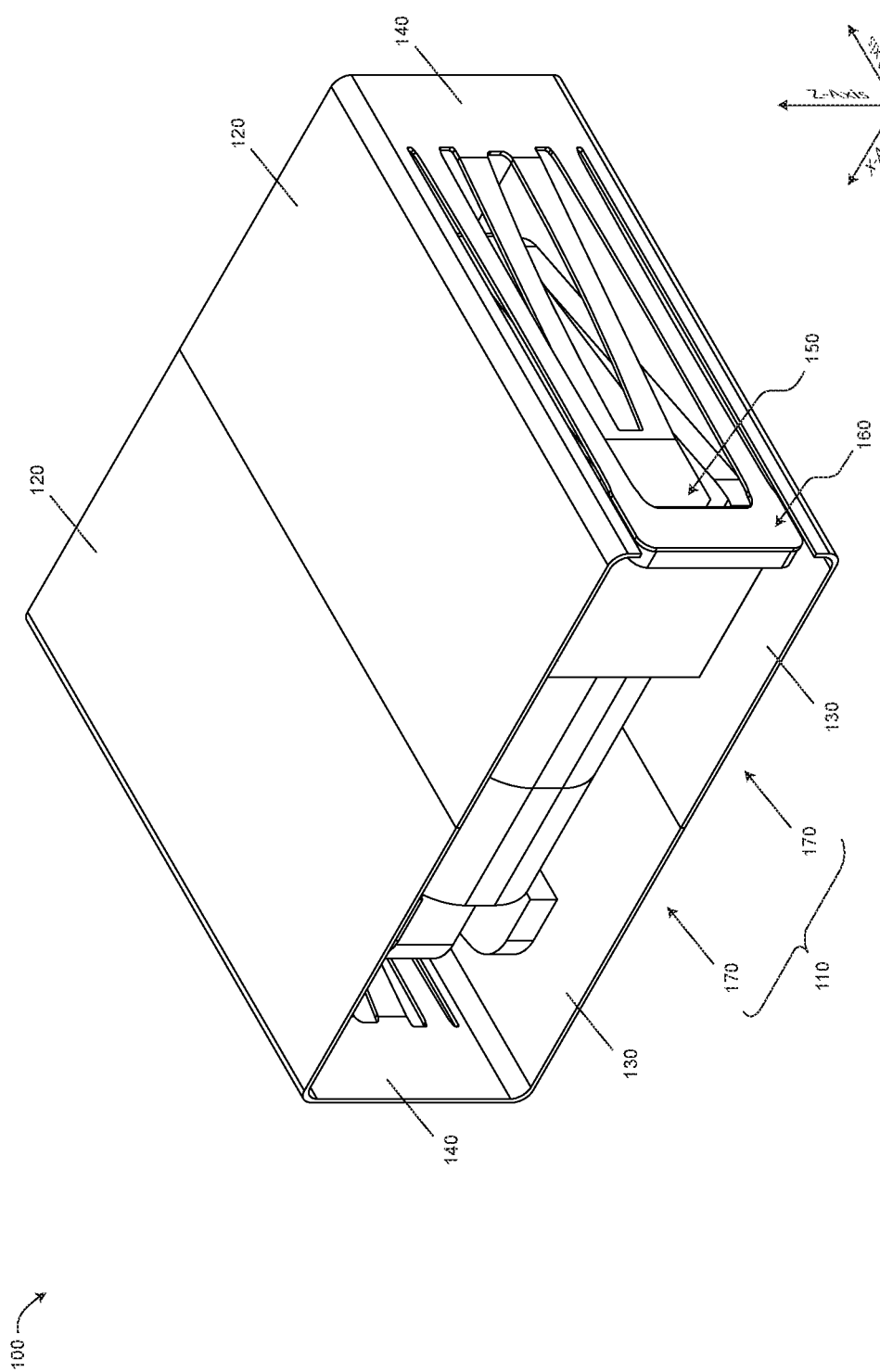
FIG. 1 illustrates an isometric view of a vibrating actuator.

The present invention is directed to a vibrating actuator for providing wideband haptic feedback, although it can be used in a variety of applications that provide vibrotactile feedback. A wide bandwidth in haptic feedback, for example from 40 to 120 Hz, is important as it reproduces the multiple, complex frequencies found in real world environments. Typically, a moving magnet vibrating actuator or a moving coil vibrating actuator only has one resonant frequency, for example 110 Hz. Such a vibrating actuator can have a useful bandwidth of only 100 to 120 Hz. When such a vibrating actuator is utilised to reproduce a range of frequencies outside this 100 to 120 Hz range, for example, 60 to 80 Hz, it provides a poor user experience due to a strong decrease in efficiency away from the tuned resonant frequency of 110 Hz. The decreased efficiency and increased power consumption can degrade the performance of a device in which the actuator is embedded. For example, the battery life in a mobile device is reduced; the quality of vibration significantly drops in medical applications; the overall performance of gaming devices such as headsets, gaming consoles, etc, is degraded. There is a need for a technical solution that will spread the useful, efficient bandwidth of an actuator to be able to match the frequency range of 40 Hz to 120 Hz, similar to the range of the complex frequencies found in real world environments.

The above problem with a single frequency vibrating actuator can be solved using a multiple frequency vibrating actuator. In an ideal scenario, a single frequency resonant actuator should be capable of responding equally to a range of frequencies, however, due to the typical distribution of the frequency response curve, the vibrating actuator responds efficiently only at the resonant frequency. Other frequencies around the resonant frequency are damped out considerably. The problem is solved by having a multiple resonant frequency vibrating actuator that responds efficiently to a wide range of frequencies. Due to the technical difficulty of incorporating multiple resonant frequencies in a miniature device, it is advantageous to have at least two resonant frequencies to solve the problem of single resonant frequency actuators. The novel vibrating actuator responds efficiently to both the resonant frequencies, say the first resonant frequency f1 (60 Hz) and the second resonant frequency f2 (100 Hz). When the two resonant frequencies are well defined and spread apart to allow a wide bandwidth, for example, 60 Hz to 100 Hz, and are still close enough to allow good response in between the two frequencies, then it will allow good performance across the full wideband frequency range, for example every frequency between 40 and 120 Hz. The innovative vibrating actuator allows a wide range of frequencies to be efficiently produced with optimal current consumption, thus enhancing the performance of the vibrating actuator for wideband applications.

Furthermore, when implementing a miniature vibrating actuator in a compact device, such as a mobile phone, tablet, stylus or laptop; the available volume of space is limited compared to other larger devices such as a mouse, keyboard or gamepad. The space constraint in compact devices creates multiple problems. The first problem is, in order to achieve a realistic and strong amount of acceleration during vibration across the frequency range, the moving parts which are either the moving magnets or the moving coils, or both the moving magnets and the moving coils, should have a large mass. As a result of having a larger mass for the magnets and coils, there is less space in the vibrating actuator for additional parts, such as affixing screws or additional subassemblies for holding the magnet and coils. The second problem is, as the actuator size decreases, the tolerances in manufacturing decrease, therefore miniature actuators are difficult to assemble. Additionally, the usage of multiple parts in an assembly of a miniature actuator can contribute to tolerance stackup as the individual tolerances of the parts are accumulated, therefore the performance characteristics of the actuator have a high variance.

The novel vibrating actuator overcomes the aforementioned problems by reducing the number of parts required for the assembly by combining multiple sub-assemblies into one integrated part, such as combining the chassis and elastic members into a single integrated structure. Additionally, the size of the magnets can be reduced by introducing a pair of guiding magnets, which direct the magnetic field lines in such a way that the magnetic field lines traverse the coils at an angle, which is orthogonal to the direction of the winding of the coils, with a resulting Lorenz force along a single axis.

The novel vibrating actuator can be utilised in all devices and applications which provide haptic feedback such as but not limited to gaming pads, mobile devices such as mobile phones, tablets, medical equipment, automotive systems and other application areas. The innovative vibrating actuator can also be used to enhance the performance of all the haptic devices where the performance and capability of wideband actuators are required, but wherein these devices have been constrained by the use of single frequency actuators such as Linear Resonant Actuators (LRA) or Eccentric Rotating Mass (ERM) actuators.

The present invention and its advantages are best understood by referring to the illustrated embodiments shown in the accompanying drawings, in which like numbers designate like parts. The present invention may, however, be embodied in numerous devices for producing haptic output and should not be construed as being limited to the exemplary embodiments set forth herein. Exemplary embodiments are described below to illustrate the present invention by referring to the figures.

In this application, the term "longitudinal" means in the linear direction of the movement of the moving parts of the vibrating actuator, which is considered along the X-axis; "transversal" means in a direction in the plane orthogonal to the longitudinal direction, which is considered along the Y-axis; "orthogonal to X-Y-plane" means in the Z-axis, that is orthogonal to both the X-axis and the Y-axis; and "diagonally opposite" means opposite corners of two parallel sides of a square or a rectangle structure.

The present invention provides a unique and novel vibrating actuator having two different resonant frequencies. The two different resonant frequencies are produced by a first moving part and a second moving part with each of the first moving part and the second moving part suspended by a pair of elastic members.

Figure 2:
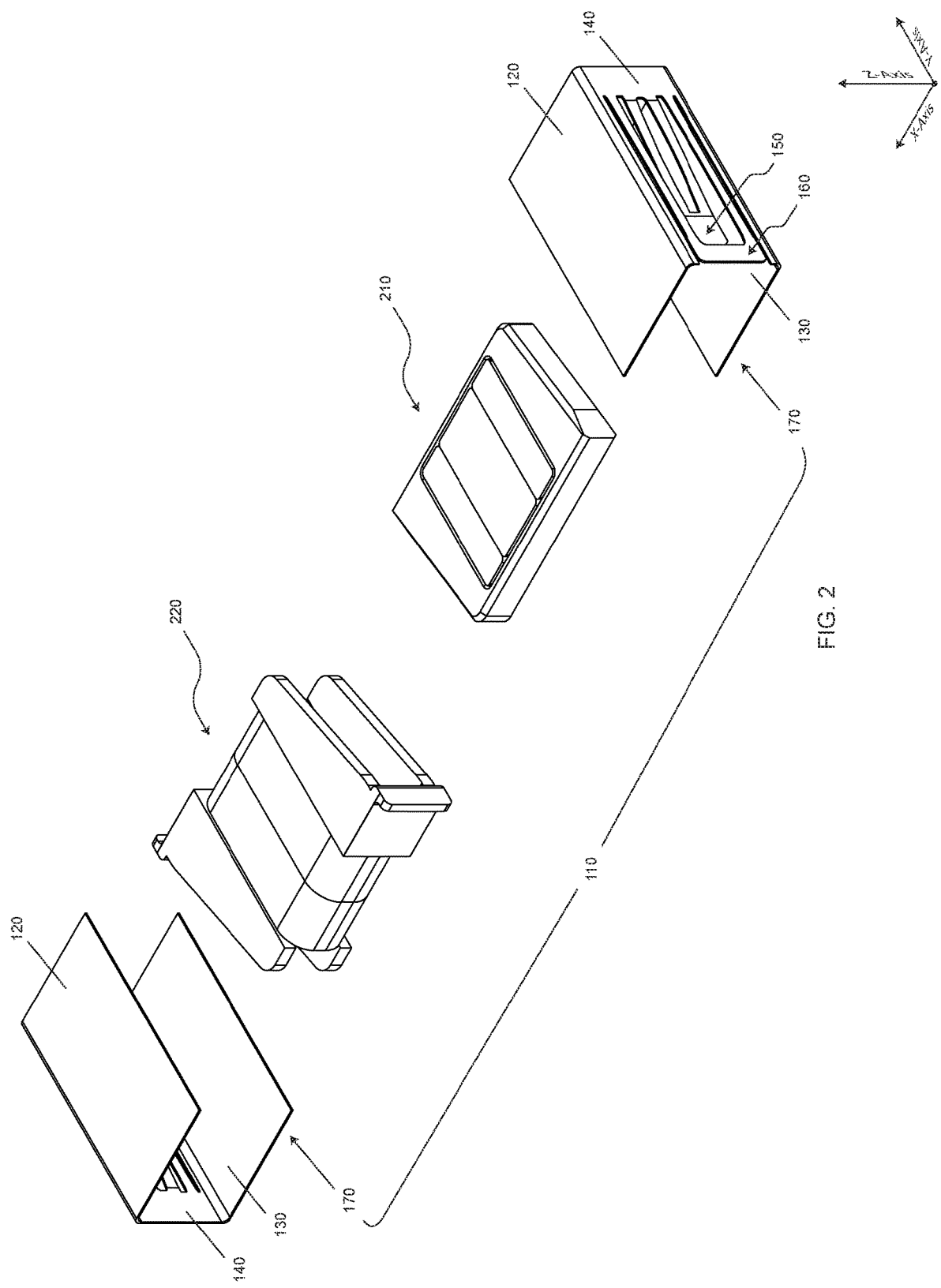
FIG. 2 illustrates an exploded isometric view of the vibrating actuator with a first moving part, a second moving part, and a chassis.

FIG. 1 and FIG. 2 illustrate an isometric view and an exploded isometric view of the vibrating actuator 100. The vibrating actuator 100 includes a first moving part 210, a second moving part 220 and the chassis 110 apart from other parts. The chassis 110 is formed by two parts 170. In the preferred implementation, the two parts 170 are U-shaped as shown in FIG. 2. However, in another implementation, the chassis 110 can be formed by two parts 250, which can be L-shaped as illustrated in FIG. 2A. In another implementation, as illustrated in FIG. 2B, the chassis 110 is formed by a single part 260, which is U-shaped. In yet another implementation, the chassis 110 is formed by a single part 270, which is sealed at one end to form a rectangular parallelepiped structure as illustrated in FIG. 2C.

In the preferred implementation, when the two parts 170 of the chassis 110 are U-shaped, each of the two parts of the chassis 110 is formed by an upper plate 120 and a lower plate 130. The upper plate 120 and the lower plate 130 are folded orthogonally to form a lateral plate 140. For example, the upper plate 120 is folded orthogonally to form a lateral plate 140, which in turn is folded orthogonally to form the lower plate 130 so as to form a U-shaped structure. The upper plate 120 and lower plate 130 are identical in shape, size and dimension. The two parts 170 are mated together to form a rectangular parallelepiped shaped chassis 110. The chassis 110 is assembled by mating the parts 170 by welding or gluing such that the top ends of the second elastic members 160 are placed in the opposite direction. For example, one of the two parts 170 is rotated 180 degrees around the axis perpendicular to the X-Y-plane (Z-axis) with respect to the other part to form the rectangular parallelepiped chassis 110.

The lateral plate 140 includes the first elastic member 150 and the second elastic member 160.

Each of the two parts 170 of the chassis 110 includes a first elastic member 150 and a second elastic member 160. The first elastic member 150 and the second elastic member 160 are fabricated by cutting and folding the lateral plate 140. The first elastic member 150 is U-shaped, with the two ends of the U-shape terminating into the lateral plate 140. Likewise, the second elastic member 160 is U-shaped, with the two ends of the U-shape terminating into the lateral plate 140. Additionally, the second elastic member 160 arches over the first elastic member 150 such that the first elastic member 150 and the second elastic member 160 operate independently of each other.

The first elastic member 150 is affixed to the first moving part 210 and the second elastic member 160 is affixed to the second moving part 220 on each of the two parts 170 of the chassis 110. The first elastic member 150 has a slight inward bend, towards the center of the vibrating actuator, with respect to the plane (Y-Z-plane) of the lateral plate 140, whereas the second elastic member 160 and the lateral plate 140 are in the same plane.

Figure 4A:
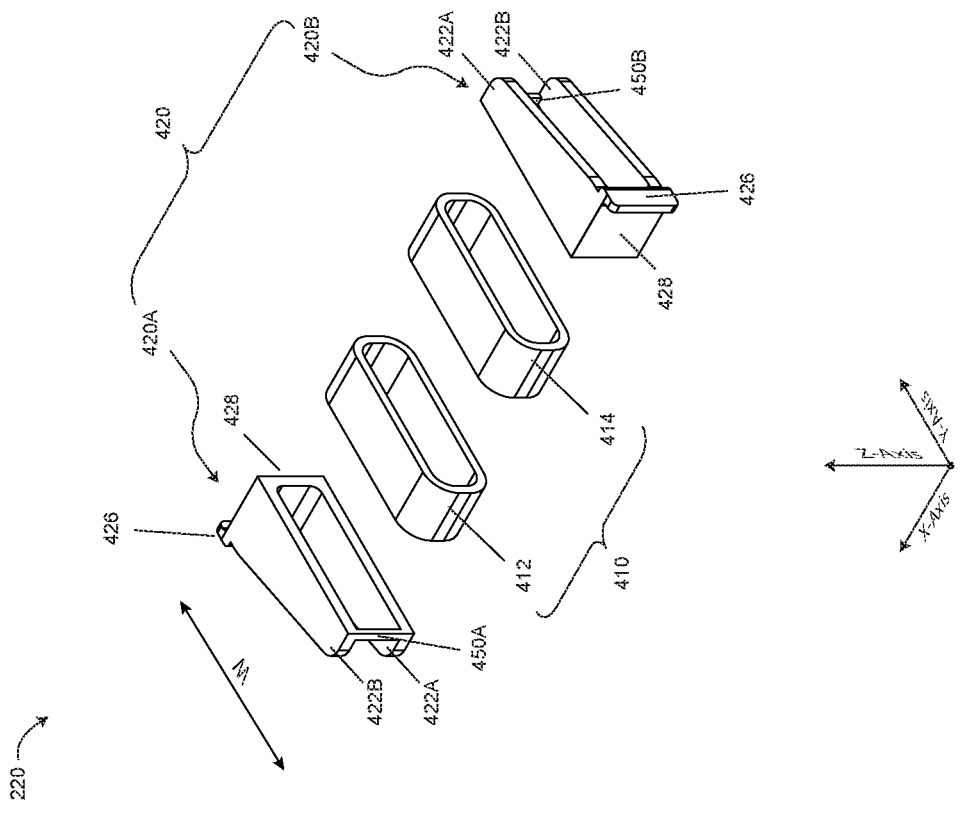
FIG. 4A illustrates a variation of the second moving part of the vibrating actuator.
Figure 4:
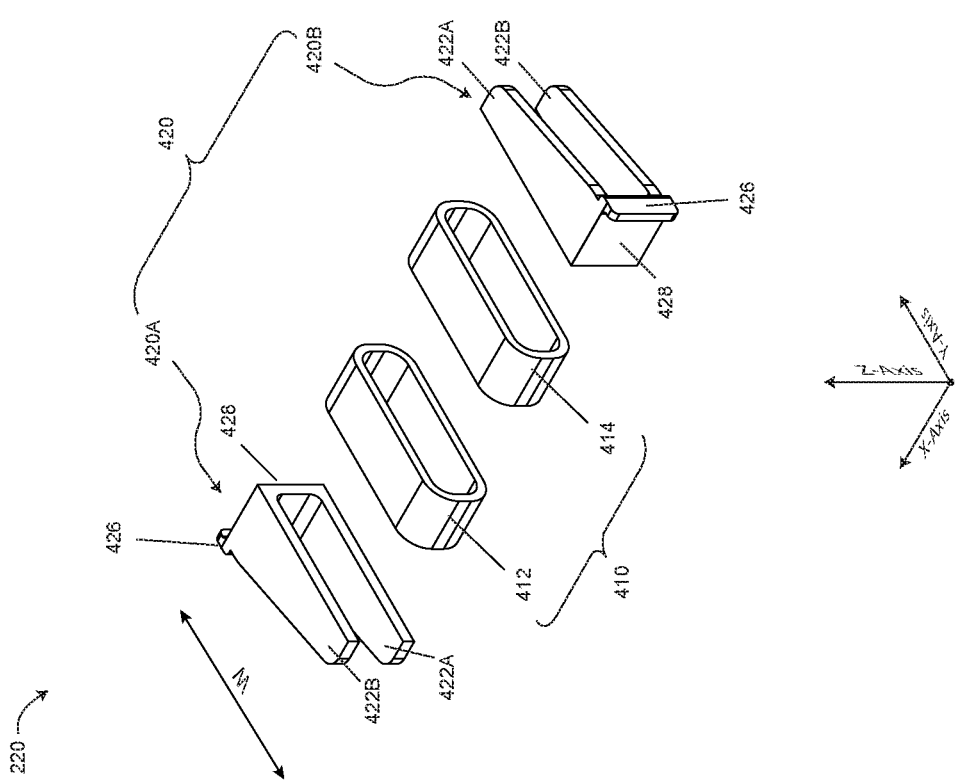
FIG. 4 illustrates the second moving part of the vibrating actuator.

FIG. 3 illustrates the different parts of the first moving part 210 and FIG. 4 illustrates the different parts of the second moving part 220. The first moving part 210 comprises a frame 310 and an arrangement of magnets 320. The second moving part 220 comprises U-shaped brackets 420 and at least one coil 410.

The frame 310 is formed by an outer rectangular periphery 302 having a hollow rectangular space 304. Alternatively, the frame 310 can be formed with an outer square periphery having a hollow rectangular space 304. Other geometrical shapes are also possible for the outer periphery such as but not limited to parallelogram, trapezoid, etc. In the preferred implementation, the frame 320 is rectangular having an outer rectangular periphery 302.

The frame 310 is constructed by stamping or laser cutting and folding any non-magnetic sheet metal such as stainless steel, aluminum, nickel, copper, brass, zinc or any other non-magnetic material. In another variation, the frame 310 is injection molded out of a polymer such as plastic or can be cast out of any non-magnetic material. When the frame 310 is constructed using plastic or any other polymer, the frame 310 can be printed using a 3D printer for fast assembly. The outer rectangular periphery 302 edges are rounded, chamfered, or filleted to avoid sharp edges, which can accidentally cause damage to either the first elastic member 150 or the second elastic member 160. The hollow rectangle 304 provided in the frame 310 has rounded corners, which are utilized for securely fitting the arrangement of magnets 320. Accordingly, the arrangement of magnets 320 also has rounded edges to mate perfectly within the frame 310.

The short sides of the outer rectangular periphery 302 of the frame 310 are along the transversal direction and have provisions for joining the first elastic member 150 of each of the two parts 170 of the chassis 110. The first elastic members 150 can be affixed to the outer rectangular periphery 302 by either welding, riveting, gluing, with screws, or via folds that mechanically mate to form a strong joint or bond. The first elastic member 150 formed on each of the two parts 170 of the chassis 110 is affixed on the diagonally opposite sides of the outer rectangular periphery 302 of the frame 310.

The arrangement of magnets 320 comprises a first magnet 322, a second magnet 324 and a third magnet 326 in the present implementation, but in other variations more than or less than three magnets can be arranged inside the frame 310. Accordingly, the frame 310 can be fabricated to accommodate two or more magnets. All four edges of the first magnet 322, the second magnet 324, and the third magnet 326 are rounded to avoid sharp edges; although in some variations the sharp edges can also be eliminated by other known geometries. For example, the edges of the first magnet 322, the second magnet 324, and the third magnet 326 can be chamfered edges or fillet edges. In another variation, the first magnet 322, the second magnet 324, and the third magnet 326 can all have non-square edges. The polarities of the first magnet 322 and the second magnet 324 are disposed to be symmetrical, that is, the north pole of the first magnet 322 and the north pole of the second magnet 324 face each other. Likewise, the polarity of the second magnet 324 and the third magnet 326 are disposed to be symmetrical, that is, the south pole of the second magnet 324 and the south pole of the third magnet 326 face each other. This configuration creates a strong magnetic field that moves radially outwards from the intersection of the first magnet 322 and the second magnet 324 with like poles facing each other (north pole facing north pole) and radially inwards at the intersection of the second magnet 324 and the third magnet 326 with like poles facing each other (south pole facing south pole). Additionally, the first magnet 322, the second magnet 324, and the third magnet 326 are equal in width (shown by W in FIG. 3) but have different lengths in longitudinal direction (along the X-axis). For example, in the present implementation, the width and length of the first magnet 322 and the third magnet 326 is equal, while the second magnet 324 has substantially larger length. In different variations, the first magnet 322, the second magnet 324, and the third magnet 326 can all have equal or unequal width and length depending upon the frame 310. Additionally, the size of each magnet in the arrangement of magnets 320 can be the same or different depending upon the requirements of magnetic field to be generated.

The arrangement of magnets 320 with like poles facing each serves to create a high concentration of the magnetic field inside the at least one coil 410. If the arrangement of magnets 320 comprises three magnets 322, 324, 326, two coils 412, 414 are provided. In this implementation, the highly concentrated magnetic field generated in the coils 412, 414 is due to the magnetic fields generated by the first magnet 322, the second magnet 324, and the third magnet 326. The binding of the first magnet 322, the second magnet 324, and the third magnet 326 can be very difficult since the like poles of the magnets repel each other. The frame 310 is designed to securely hold the arrangement of magnets 320, for example, the first magnet 322, the second magnet 324, and the third magnet 326 in the frame 310. Alternatively, the frame 310 can also be used to securely hold the first magnet 322, the second magnet 324, and the third magnet 326 in the frame 310 for initial assembly by gluing and the frame 310 is then removed after the glue has cured and the arrangement of magnets 320 is placed in the coils 410 to create a frameless arrangement of magnets. Furthermore, the frame 310 provides additional mass to the first moving part 210. By varying the mass of the frame 310 and the arrangement of magnets 320, different resonant frequencies and vibration strengths can be achieved.

When the arrangement of magnets 320 is placed with like poles facing each other inside the frame 310, the two outer ends of the magnets form the two outer poles 328. The frame 310 is attached to the first elastic member 150 of each of the two parts 170 of the chassis 110 on diagonally opposite sides such that the outer poles 328 of the arrangement of magnets 320 face each first elastic member 150.

In one alternate variation of this implementation, the first moving part 210 comprises the frame 310, the arrangement of magnets 320 with a spacer provided in between the magnets. The spacer can be a non-magnetic material or a paramagnetic material that reduces the size of each magnet in the arrangement of magnets 320, to reduce cost.

Referring to FIG. 4, the second moving part 220 comprises the at least one coil 410 and the U-shaped brackets 420. There can be any number of coils, for example, a single coil 412, however, in this embodiment, there are two coils 410, i.e., a first coil 412 and a second coil 414 as shown in FIG. 4. The number of coils 410 is determined by a simple formula n−1, where n is the number of magnets 320, except in a special case when n=1 then there is only one magnet 322 and one coil 410.

The coils 410 are constructed by winding an enamelled copper wire around a bobbin, which is long in the transversal direction (Y-axis). Additionally, the length of coils 410 is slightly greater than the length of the frame 310 to allow free movement of the first moving part 210 in the longitudinal direction (X-axis).

In the preferred implementation, there are two coils 410 comprising the first coil 412 and the second coil 414 with an equal number of windings and the same dimensions, however, in other variations as shown in FIG. 5A-5F there can be different combinations with unequal windings and dimensions of the coils 410. The first coil 412 and the second coil 414 are connected together such that the first coil 412 is wound in one direction, for example, clockwise and the second coil 414 is wound in the opposite direction, for example, anti-clockwise. In addition, the longitudinal center of the first coil 412 is longitudinally aligned with the transversal intersection line of the first magnet 322 and the second magnet 324 arranged with the north pole facing the north pole of the first magnet 322 and the second magnet 324. Likewise, the longitudinal center of the second coil 414 is longitudinally aligned with the transversal intersection line of the second magnet 324 and the third magnet 326 arranged with the south pole facing the south pole of the two magnets 324 and 326. In an alternate implementation, the longitudinal center of the first coil 412 may not longitudinally coincide with the transversal intersection line of the first magnet 322 and the second magnet 324 but is near or around it, that is, off center and non-coinciding. In another implementation, the longitudinal center of the second coil 414 may not longitudinally coincide with the transversal intersection line of the second magnet 324 and the third magnet 326 but is near or around it, that is, off center and non-coinciding.

The two ends of the coil 410 terminate into a connector or conductors for providing alternating electric current into the coils 410. When an alternating electric current passes through the coils 410, the alternating current interacts with the magnetic field of the magnets 320 to produce a Lorentz force. The Lorentz force is generated in one direction during the first half cycle and in the opposite direction in the second half cycle to produce a vibratory motion in the longitudinal direction (X-axis).

FIG. 4 and FIG. 4A illustrate the different variations of the second moving part 220 with different types of the U-shaped brackets 420 attached to the coils 410. The U-shaped brackets 420 comprise the U-shape bracket 420A and the U-shaped bracket 420B, which are identical in shape, size, and construction.

FIG. 4 shows a pair of U-shaped brackets 420, in which each of the U-shaped brackets 420 is made of a non-magnetic material and comprises three different sections: a base plate 428 having a protruding element 426 orthogonal to the face of the base plate 428 and two right trapezoid shaped plates 422, that is, a first right trapezoid shaped plate 422A and a second right trapezoid shaped plate 422B. The first right trapezoid shaped plate 422A and the second right trapezoid shaped plate 422B are similar in size and dimensions. The first right trapezoid plate 422A and the second right trapezoid plate 422B are orientated on either side of the base plate 428, such that the entire assembly creates a structure that looks like the U-shaped bracket 420A or the U-shaped bracket 420B, as shown in FIG. 4, with an open face. In the preferred implementation, the open face of the pair of U-shaped brackets 420 extends slightly beyond the frame 310 in the transversal direction (Y-axis). The U-shaped brackets 420 are fabricated by cutting and folding non-magnetic sheet metal. Alternatively, the pair of U-shaped brackets 420 can also be formed by welding the base plate 428 to two separate right trapezoid shaped plates 422A and 422B. The U-shaped bracket 420A is attached to coil 412 and the U-shaped bracket 420B is attached to coil 414 such that their open faces are diagonally opposite to each other and substantially cover the longitudinal side (X-axis) of the frame 310 as shown in FIG. 4. The protruding element 426 is used for welding the second elastic members 160 of the two parts 170 of the chassis 110 with the U-shaped brackets 420.

The first coil 412 and the second coil 414 are joined to each other by glue or bonding material. Furthermore, the first coil 412 is attached to the U-shaped bracket 420A by glue or bonding material and the second coil 414 is attached to the U-shaped bracket 420B such as to form a rectangular tubular structure, which moves freely over the first moving part 210.

FIG. 4A illustrates another variation of the U-shaped brackets 420. The U-shaped bracket 420A has a metal strip or a metal rod 450A that joins the first right trapezoid shaped plate 422A and the second right trapezoid shaped plate 422B, such that the metal strip or the metal rod 450A is parallel to the base plate 428 as shown in FIG. 4A. The U-shaped bracket 420B is similar in size and dimension to the U-shaped bracket 420A.

FIG. 5A-5F show the different arrangements of the magnets 320 and the coils 410 in different variations of the present invention. All these variations can be implemented in the vibration actuator 100 in different embodiments. In all the embodiments, the like poles of the magnets of the arrangement of magnets 320 face each other.

FIG. 5A shows a configuration of an arrangement of magnets 320 comprising the first magnet 322, the second magnet 324, and only one coil 412. The transversal intersection line of the first magnet 322 and the second magnet 324 is longitudinally aligned with the longitudinal center of the coil 412. In another variation of this implementation, the transversal intersection line of the first magnet 322 and the second magnet 324 and the longitudinal center of the coil 412 are longitudinally offset by a small distance, for example, between 0.25 mm to 2 mm.

FIG. 5B shows the preferred implementation with the arrangement of magnets 320 comprising three magnets, that is, the first magnet 322, the second magnet 324, the third magnet 326, wherein the coils 410 include two coils, that is, the first coil 412 and the second coil 414. In this embodiment, the longitudinal center of each of the coils 410 is longitudinally aligned with the corresponding transversal intersection line of adjacent magnets of the arrangement of magnets 320. In another variation of this implementation, the transversal intersection lines of the adjacent magnets and the longitudinal centers of the first coil 412 and the second coil 414 are longitudinally offset by a small distance, for example, between 0.25 mm to 2 mm.

FIG. 5C illustrates the configuration with four magnets and three coils. The arrangement of magnets 320 comprises the first magnet 322, the second magnet 324, the third magnet 326 and a fourth magnet 380. Similarly, the coils 410 include three coils, that is, the first coil 412, the second coil 414, and a third coil 480. In this implementation, the longitudinal center of each of the coils 410 is longitudinally aligned with the corresponding transversal intersection line of adjacent magnets. For example, the longitudinal center of the first coil 412 is longitudinally aligned with the transversal intersection line of the first magnet 322 and the second magnet 324, the longitudinal center of the second coil 414 is longitudinally aligned with the transversal intersection line of the second magnet 324 and the third magnet 326 and the longitudinal center of the third coil 480 is longitudinally aligned with the transversal intersection line of the third magnet 326 and the fourth magnet 380. In another variation of this implementation, the centers of the coils are longitudinally offset by a small distance, for example, between 0.25 mm to 2 mm with respect to the transversal lines of intersection of adjacent magnets.

FIG. 5D shows the arrangement of magnets 320 comprising the first magnet 322 and the second magnet 324 with a spacer 502 provided in between the first magnet 322 and the second magnet 324 and the coil 412. In addition, the coil 412 is wound around the arrangement of magnets 320 such that the spacer 502 is longitudinally aligned with the longitudinal center of the coil 412. As described earlier, the spacer 502 is a non-magnetic material or a paramagnetic material that reduces the size of each magnet in the arrangement of magnets 320 to reduce cost. In another variation of this implementation, the spacer 502 and the longitudinal center of the coil 412 are longitudinally offset by a small distance, for example, between 0.25 mm to 2 mm.

FIG. 5E shows the arrangement of magnets 320 comprising three magnets, that is, the first magnet 322, the second magnet 324, and the third magnet 326 and the coils 410. The spacer 502 is provided in between the adjacent magnets of the arrangement of magnets 320. For example, the spacer 502 is provided between the first magnet 322 and the second magnet 324. Similarly, the spacer 502 is provided between the second magnet 324 and the third magnet 326. In addition, the coils 410 include the first coil 412 and the second coil 414. The longitudinal center of the first coil 412 is longitudinally aligned with the longitudinal center of the spacer 502 provided between the first magnet 322 and the second magnet 324. Likewise, the longitudinal center of the second coil 414 is longitudinally aligned with the longitudinal center of the spacer 502 provided between the second magnet 324 and the third magnet 326. Alternatively, the longitudinal center of the first coil 412 can be longitudinally offset from the longitudinal center of the spacer 502 provided between the first magnet 322 and the second magnet 324 and the longitudinal center of the second coil 414 can be longitudinally offset from the longitudinal center of the spacer 502 provided between the second magnet 324 and the third magnet 326. In this implementation, the offset is between 0.25 mm to 2 mm.

FIG. 5F shows the arrangement of magnets 320 comprising two pairs of two magnets and two coils 410. The first pair of magnets includes the first magnet 322 and the second magnet 324. The second pair of magnets includes the third magnet 326 and the fourth magnet 380. The spacer 502 is provided in between the first pair of magnets and the second pair of magnets. The coils 410 comprise the first coil 412 and the second coil 414. The first coil 412 is wound around the first pair of magnets such that the longitudinal center of the first coil 412 is longitudinally aligned with the transversal intersection line of the first magnet 322 and the second magnet 324. The second coil 414 is wound around the second pair of magnets such that the longitudinal center of the second coil 414 is longitudinally aligned with the transversal intersection line of the third magnet 326 and the fourth magnet 380. In another variation of this implementation, the longitudinal center of the first coil 412 and the transversal intersection line of the first magnet 322 and the second magnet 324 and the longitudinal center of the second coil 414 and the transversal intersection line of the third magnet 326 and the fourth magnet 380 are longitudinally offset by a small distance, for example, between 0.25 mm to 2 mm.

Figure 6:
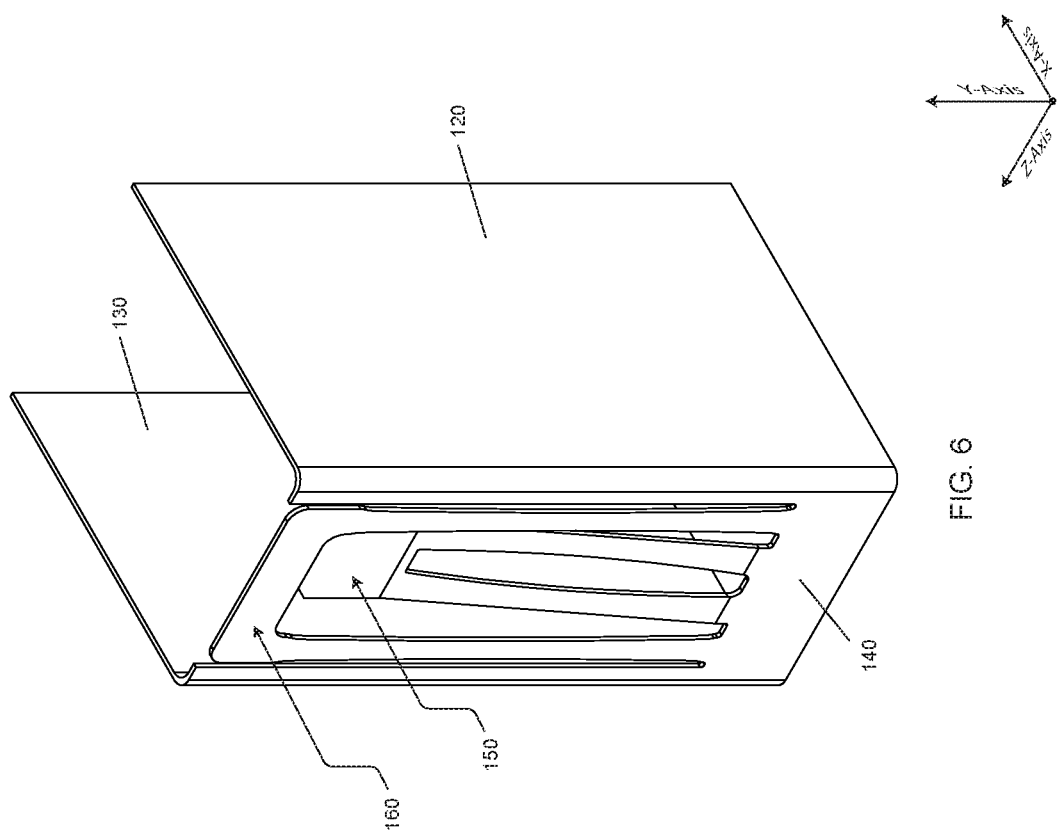
FIG. 6 illustrates an isometric view of one of two parts of the chassis having a first elastic member and a second elastic member.

FIG. 6 illustrates one of the two parts 170 of the chassis 110. Each of the two parts 170 of the chassis 110 includes the first elastic member 150 and the second elastic member 160, which are U-shaped. The first elastic member 150 and the second elastic member 160 are fabricated by cutting and stamping the lateral plate 140. The first elastic member 150 is slightly bent inwards, towards the center of the vibrating actuator, with respect to the plane (Y-Z-plane) of the lateral plate 140, and has a flat plate at the base for attaching with the first moving part 210. Furthermore, the second elastic member 160 is aligned with the plane (Y-Z-plane) of the lateral plate 140.

Figure 7:
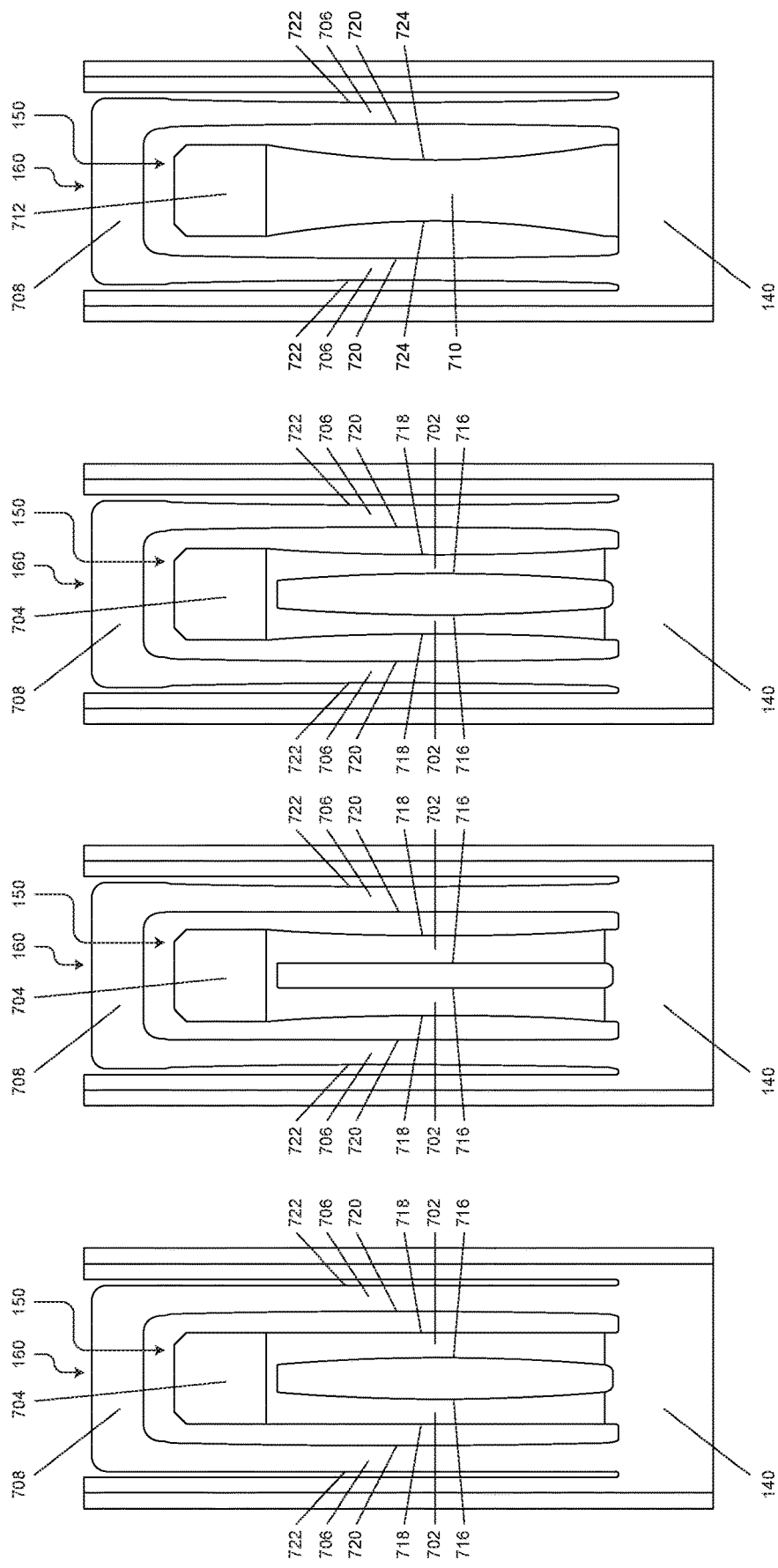

FIG. 7, FIG. 7A, and FIG. 7B illustrate different variations of the first elastic member 150 and the second elastic member 160.

FIG. 7 illustrates the preferred embodiment of the first elastic member 150 and the second elastic member 160.

The first elastic member 150 is U-shaped having two parallel thin strips, which form two legs 702 and a base in the form of a rectangular plate 704. The rectangular plate 704 is separated by a small distance and is parallel to the plane (Y-Z-plane) of the lateral plate 140. The two legs 702, which join the rectangular plate 704 and the lateral plate 140 are inclined at an angle as shown in FIG. 6. The rectangular plate 704 of the first elastic member 150 of each of the two parts 170 of the chassis 110 is utilised for affixing the first elastic member 150 to the frame 310 of the first moving part 210. In another variation, where the frame 310 has only been used to secure the magnets of the arrangement of magnets 320 during gluing and then removed, each rectangular plate 704 of each of the first elastic member 150 of the two parts 170 of the chassis 110 is attached to one of the two outer poles 328 of the arrangement of magnets 320. The two legs 702 of the first elastic member 150 have transversal indentations along their inner edges 716, while their outer edges 718 are straight as shown in FIG. 7. In an alternate implementation as shown in FIG. 7A, the two legs 702 of the first elastic member 150 have transversal indentations on their outer edge 718, while their inner edge 716 is straight. In yet another alternative implementation as shown in FIG. 7B, the first elastic member 150 has transversal indentations on both the inner edge 716 and the outer edge 718 of the two legs 702.

The second elastic member 160 is also U-shaped having two parallel thin strips, which form two legs 706, and a base, which is a rectangular plate 708. The rectangular plate 708 and the lateral plate 140 are in the same plane (Y-Z-plane).

Additionally, the second elastic member 160 has transversal indentions on the inner edge 720 of the two legs 706, while the outer edge 722 of the two legs 702 is straight as shown in FIG. 7. In another variation of this implementation, the second elastic member 160 has transversal indentations on the outer edge 722 of the two legs 706, while the inner edge 720 of the two legs 702 is straight 718 as shown in FIG. 7A. In yet another variation, the two legs 706 of the second elastic member 160 have transversal indentations on both their inner edge 720 and their outer edge 722 as shown in FIG. 7B. The rectangular plate 708 is used for attaching the second elastic member 160 to the second moving part 220.

Each of the two parts 170 of the chassis 110 needs to be of a material that has good elastic properties allowing the first elastic member 150 and second elastic member 160 to flex and displace during vibration, while being rigid enough to keep the structural stability of the assembly. Examples of materials can be: copper beryllium, spring steel, titanium, Kevlar® or ABS plastic.

The first elastic member 150 is surrounded by the second elastic member 160 on three sides, while the fourth side of the first elastic member 150 and the second elastic member terminate into the lateral plate 140. The first elastic member 150 and the second elastic member 160 are separated from each other with a narrow gap. The separation allows the first elastic member 150 and the second elastic member 160 to vibrate independently of each other. Furthermore, the lateral plate 140 extends parallel to the two legs 706 of the second elastic member 160 up to the edge of the upper plate 120 and the lower plate 130 on both sides of the second elastic member 160 and is oriented such that there exists a narrow gap between the lateral plate 140 and the second elastic member 160.

In yet another alternative implementation as illustrated in FIG. 7C, the first elastic member 150 comprises a rectangular strip 710 with symmetrical transversal indentations on both outer edges 724 on the long sides of the rectangle and a rectangular plate 712. The rectangular strip 710 terminates into the lateral plate 140 at one end and the rectangular plate 712 at the other. The upper section of the first elastic member 150, which is a rectangular plate 712, is used for affixing the first elastic member 150 to the frame 310 of the first moving part 210. The second elastic member 160 is also U-shaped as described above. The two legs 706 of the U-shape of the second elastic member 160 terminate into the lateral plate 140 and have transversal indentations on their inner edge 720 and their outer edge 722 as shown in FIG. 7C. In another implementation, the second elastic member 160 has transversal indentions on the inner edge 720 of the two legs 706, while the outer edge 722 of the two legs 706 is straight as shown in FIG. 7. In another variation of this implementation, the second elastic member 160 has transversal indentations on the outer edge 722 of the two legs 706, while the inner edge 722 of the two legs 702 is straight 718 as shown in FIG. 7A. In an alternate implementation, the inner edge 720 and the outer edge 722 of two legs 706 of the second elastic member 160 are straight and parallel to each other.

The indentations on the first elastic member 150 and the second elastic member 160 serve to uniformly distribute the stress across the first elastic member 150 and second elastic member 160, when displaced during vibration. For example, if the two legs 702 of the first elastic member 150 are without indentations, but rather are rectangular strips with two straight inner edges and outer faces, the stress would be concentrated towards the ends of the two legs 702, where the two legs 702 connect with the lateral plate 140 and the rectangular plate 704. Likewise, if the two legs 706 of the second elastic member 160 are without indentations, but rather are rectangular strips with straight inner and outer faces, the stress would be concentrated towards the ends of the legs 706, where the two legs 706 connect with the lateral plate 140 and the rectangular plate 708. Over many cycles of vibration, this concentration would fatigue the area around the ends of the legs (702, 706) and a microscopic crack would be formed, which then over time would become larger and lead to a complete fracture. By reducing the amount of material towards the middle of the two legs (702, 706) through indentations, a larger area of the two legs (702, 706) will deform during vibration and the stress becomes evenly distributed across the length of the two legs (702, 706) and the likelihood of a failure will be reduced.

Each of the two parts 170 of the chassis 110 is fabricated out of a highly flexible and yet rigid material that protects the vibrating actuator from structural deformation during operation and yet provides high elasticity such that the first moving part 210 and the second moving part 220 can be displaced and produce vibratory force. Examples of materials can be: copper beryllium, spring steel, titanium, Kevlar® or ABS plastic.

Figure 8:
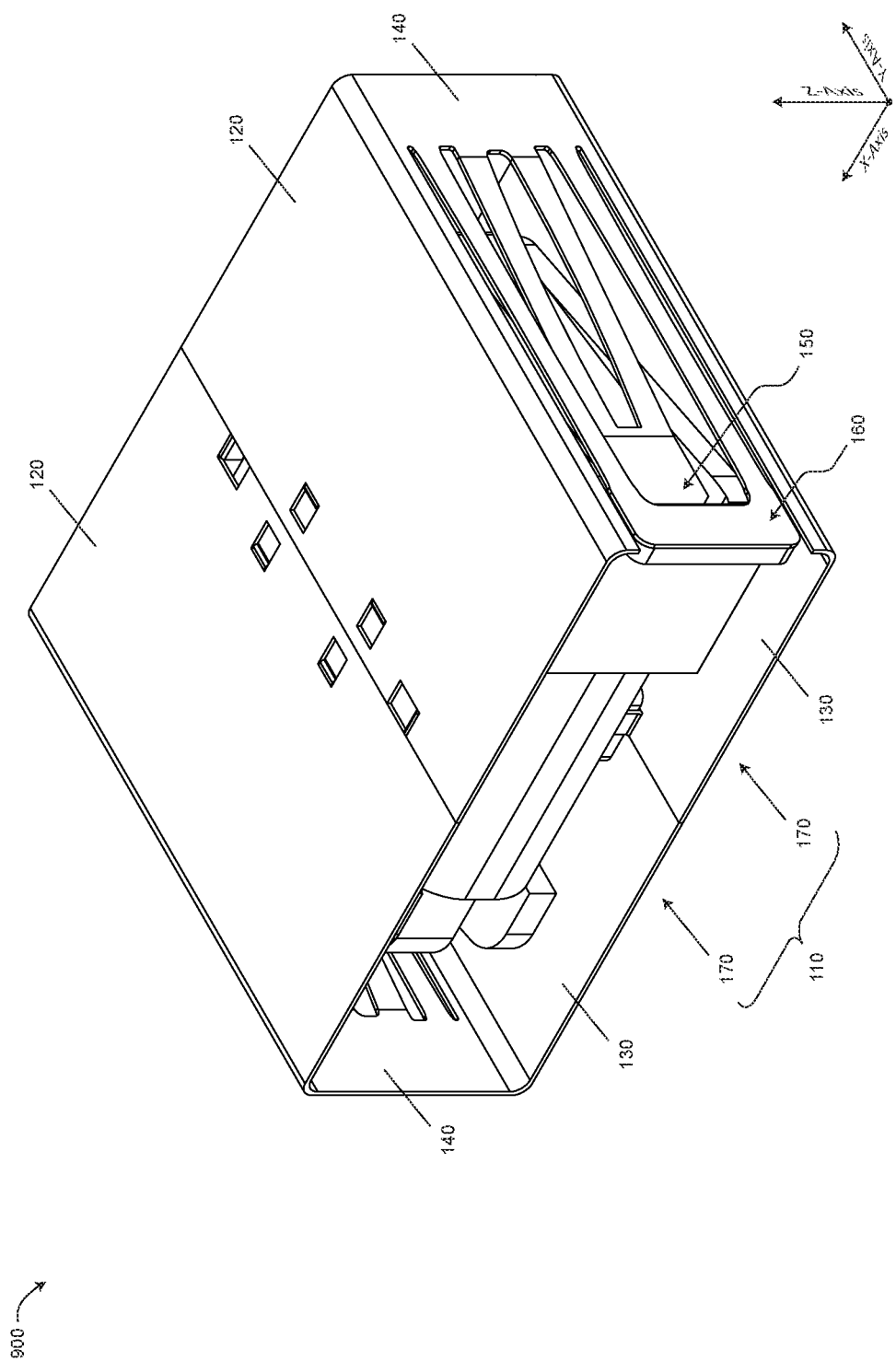
FIG. 8 illustrates an isometric view of a vibrating actuator with guiding magnets in another embodiment.
Figure 9:
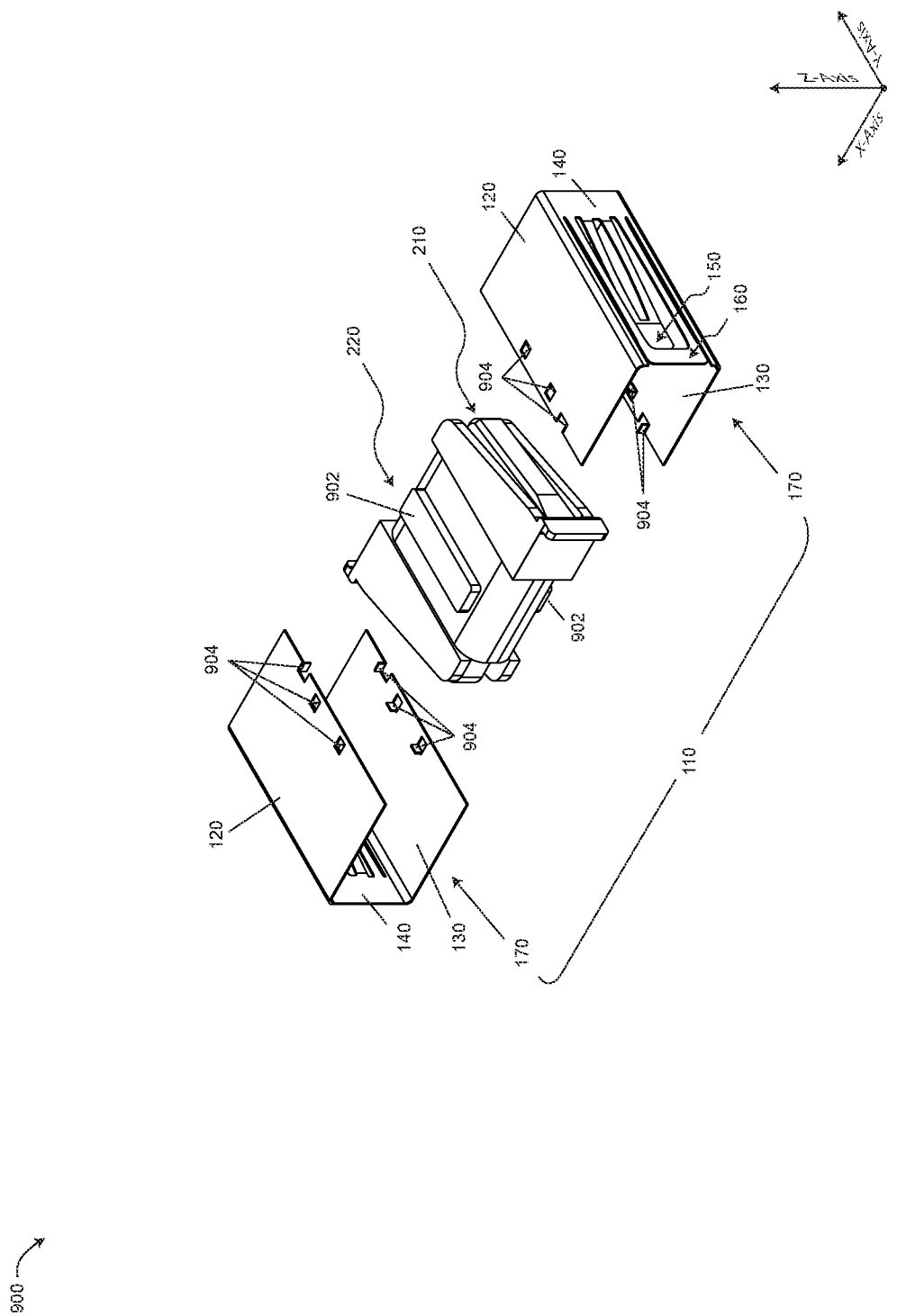
FIG. 9 illustrates an exploded isometric view of the vibrating actuator with guiding magnets and attachment means.
Figure 10:
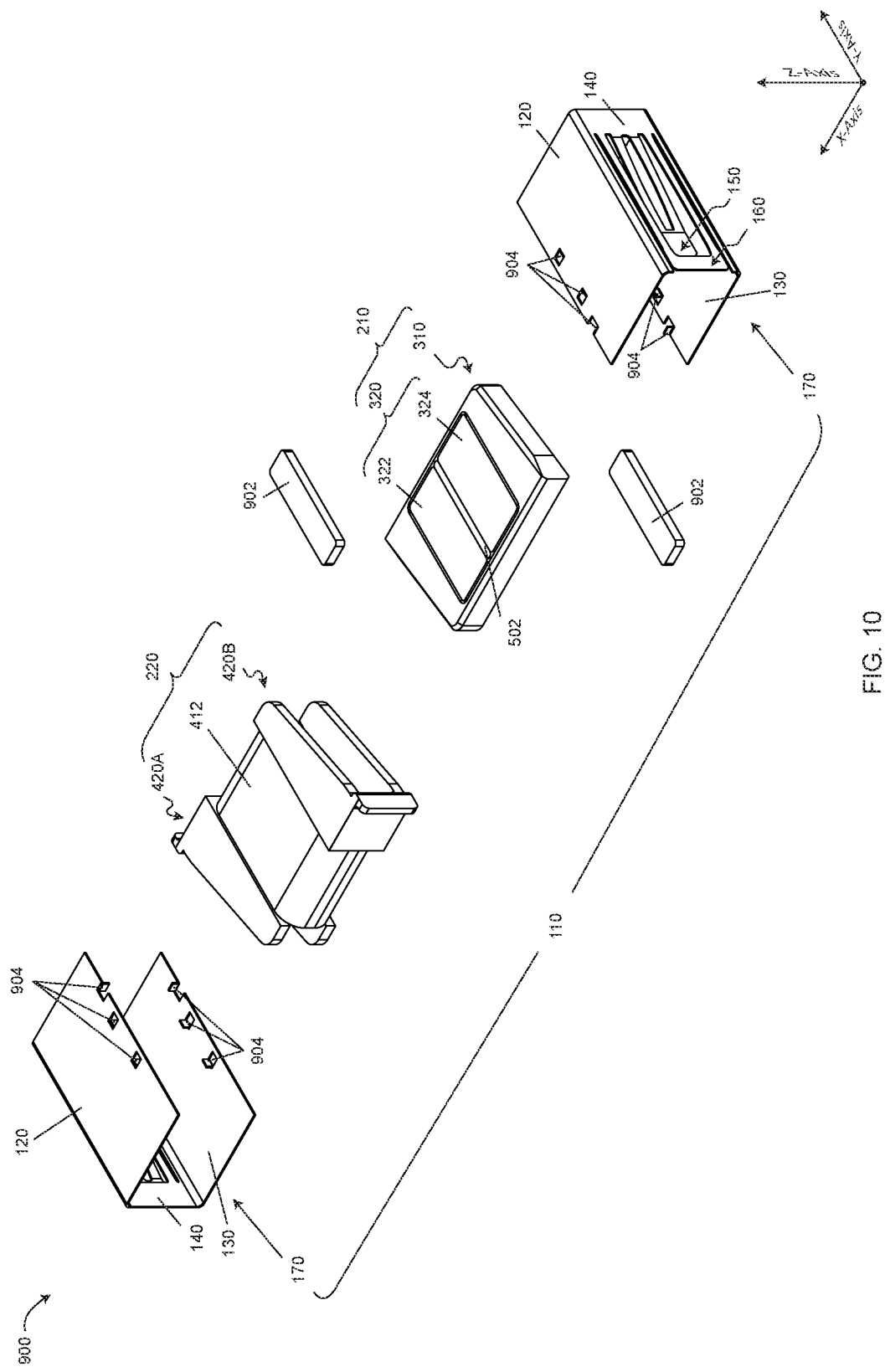
FIG. 10 illustrates an exploded isometric view showing the first moving part and second moving part of the vibrating actuator with guiding magnets.

FIG. 8 illustrates an assembled isometric view of the vibrating actuator with a spacer and guiding magnets in another embodiment of the invention. FIG. 9 illustrates a partial exploded isometric view of vibrating actuator 900 and FIG. 10 illustrates the exploded view of the vibrating actuator 900 showing the first moving part 210 and the second moving part 220.

The vibrating actuator 900 includes the first moving part 210, which comprises the frame 310 and the arrangement of magnets 320. The arrangement of magnets 320 is formed by the first magnet 322 and the second magnet 324 with the spacer 502 provided in between the adjacent magnets of the arrangement of magnets 320. In an alternate implementation, the arrangement of magnets 320 is formed by the first magnet 322 and the second magnet 324 without the spacer 502 provided, as shown in FIG. 5A. The first magnet 322 and the second magnet 324 are arranged with like poles facing each other. Further, the second moving part 220 comprises the at least one coil 410 and the U-shaped brackets 420, which includes the U-shaped bracket 420A and the U-shaped bracket 420B. In this embodiment, only one coil, that is, the coil 412 is utilised in the second moving part 220. However, in other variations, the coils 410 can be formed by the first coil 412 and the second coil 414, which are wound in opposite directions. Different variations of the arrangement of magnets 320 and the coils 410 can be implemented in this embodiment as shown in FIG. 5A to FIG. 5F. Furthermore, the vibrating actuator 900 includes the 110 chassis formed by two parts 170.

As in the embodiments described above, the chassis 110 is formed by two parts 170, which are U-shaped. However, in other variations the chassis 110 can be formed by either one part or two parts. For example, the chassis 110 can be formed with one part, which can either be the U-shaped part as shown in FIG. 2B or the closed rectangular parallelepiped structure sealed at one end as shown in FIG. 2C and as described earlier. Likewise, the chassis 110 can be formed with two parts 170 that are L-shaped as shown in FIG. 2A.

Each of the two parts 170 of chassis 110 includes the upper plate 120, the lower plate 130 and the lateral plate 140. The upper plate 120 has one or more attachment means 904 for securing a pair of guiding magnets 902. The attachment means 904 are provided directly opposite to each other on the upper plate 120 and the lower plate 130 of each of the two parts 170 of the chassis 110. The attachment means 904 are provided near and parallel to the ends of the upper plate 120 and the lower plate 130, that is the ends which are opposite from the lateral plate 140 on each of the two parts 170 of the chassis 110. In this embodiment, a first pair of attachment means 904 are provided at the end of the upper plate 120 and another pair of attachment means 904 are provided at the end of the lower plate 130 to secure each of the guiding magnets 902 in the longitudinal direction (X-axis). In addition, one attachment means 904 is provided on the upper plate 120 and one attachment means 904 is provided on the lower plate 130 on the edge diagonally opposite to the base of the lateral plate 140, where the first elastic member 150 terminates, to secure each magnet of the guiding magnets 902 in the transversal direction (Y-axis).

The attachment means 904 on the upper plate 120 and the lower plate 130 are arranged on each of the two parts 170 of the chassis 110 such that the upper plate 120 and the lower plate 130 form a mirror image of each other along the X-Y-plane. The attachments means 904 can be tabs, clips, holding brackets, etc. However, in this embodiment, the attachment means 904 are tabs stamped from the upper plate 120 and the lower plate 130 on each of the two parts 170 of the chassis 110 inwards towards the inside of the U-shape. In another variation, the attachment means 904 are clips, which are pressed after fixing the guiding magnets 902 to hold the guiding magnets 902 in the right orientation and position.

The magnetic field generated by the arrangement of magnets 320 should transverse the coils 410 orthogonally. However, due to the natural characteristics of the magnets, the magnetic field lines emerge from the north pole and converge to the south pole. The magnetic field lines are perpendicular as they emerge from the north poles of the first magnet 322 and the second magnet 324 at the center of the arrangement of magnets 320 and converge to the south poles forming an elliptical path. As the field lines generated move further away from the center of the arrangement of magnets 320 towards the end of the arrangement of magnets 320, the magnetic field lines become convergent and elliptical paths become circular. Therefore, a major part of the magnetic field lines transverse the coils 410 at an angle but not at an orthogonal angle. To overcome this problem, the two guiding magnets 902 are attached on the inside of the upper plates 120 and the lower plates 130 of the two parts 170 of the chassis 110 such that the two guiding magnets 902 are opposite to each other and the transversal center line of each of the guiding magnets 902 longitudinally coincides with the transversal intersection line of the first magnet 322 and the second magnet 324 of the arrangement of magnets 320. The guiding magnets 902 and the arrangement of magnets 320 are oriented such that their opposite poles face each other. For example, if the north pole of the first magnet 322 and the north pole of the second magnet 324 face each other, then the south poles of the guiding magnets 902 are placed directly above the north poles of the arrangement of magnets 320. By placing the guiding magnets 902 in such a way, the magnetic field lines emerging from the center of the intersection of the first magnet 322 and the second magnet 324, are guided orthogonally through the coils 410 through the guiding magnets 902 and then back into the arrangement of the magnets 320 at the outer poles 328. As such, the magnetic field lines are directed at an angle that is substantially perpendicular to the coils 410. As more of the magnetic field lines become perpendicular to the coils, the resulting Lorenz force is generated in a uniform direction which is aligned with the primary axis of vibration of the motor, which is along the longitudinal axis (X-axis).

Coming back to the two parts 170 of the chassis 110, the upper plate 120 is orthogonally folded to form the lateral plate 140. The lateral plate 140 is then orthogonally folded to form the lower plate 130 to form each of the two parts 170 of the chassis 110. The two parts 170 of the chassis 110 are identical in shape, size, and dimensions. Furthermore, each of the two parts 170 of the chassis 110 includes the first elastic member 150 and the second elastic member 160. The first elastic member 150 and the second elastic member 160 are fabricated by stamping and cutting the lateral plate 140 of each of the two parts of the chassis 110.

The vibrating actuator 900 is constructed by placing the arrangement of magnets 320 in the frame 310. The arrangement of magnets 320 comprises a first magnet 322 and the second magnet 324, with like poles facing each other and the spacer 502 is placed in between the first magnet 322 and the second magnet 324. This forms the first moving part 210. The second moving part 220 comprises a coil 412 and U-shaped brackets 420. The two ends of the coil 412 are connected to each of the U-shaped brackets 420. In other variations, the coils 410 are formed by the first coil 412 and the second coil 414 which are connected with each other at one end, while the other two ends of the coils 410 are connected to each of the U-shaped brackets 420. The first moving part 210 slides into the hollow of the second moving part 220 such that the first moving part 210 and the second moving part 220 can move freely. This assembly of the first moving part 210 and the second moving part 220 is placed between the two parts 170 of the chassis 110. The two parts 170 of the chassis 110 include attachment means 904 for affixing the guiding magnets 902. The guiding magnets 902 are then placed inside the upper plate 120 and the lower plate 130 and are secured firmly in the right orientation with the attachment means 904. The two parts 170 of the chassis 110 are placed such that the second elastic members 160 of each of the two parts 170 point in the opposite direction along the transversal axis (Y-axis). The first moving part 210 is affixed to the first elastic member 150 at the rectangular plate 704 and the second moving part 220 is affixed to the second elastic member 160 at the rectangular plate 708. The two parts 170 of the chassis 110 are affixed together to form the vibrating actuator 900.

Figure 11:
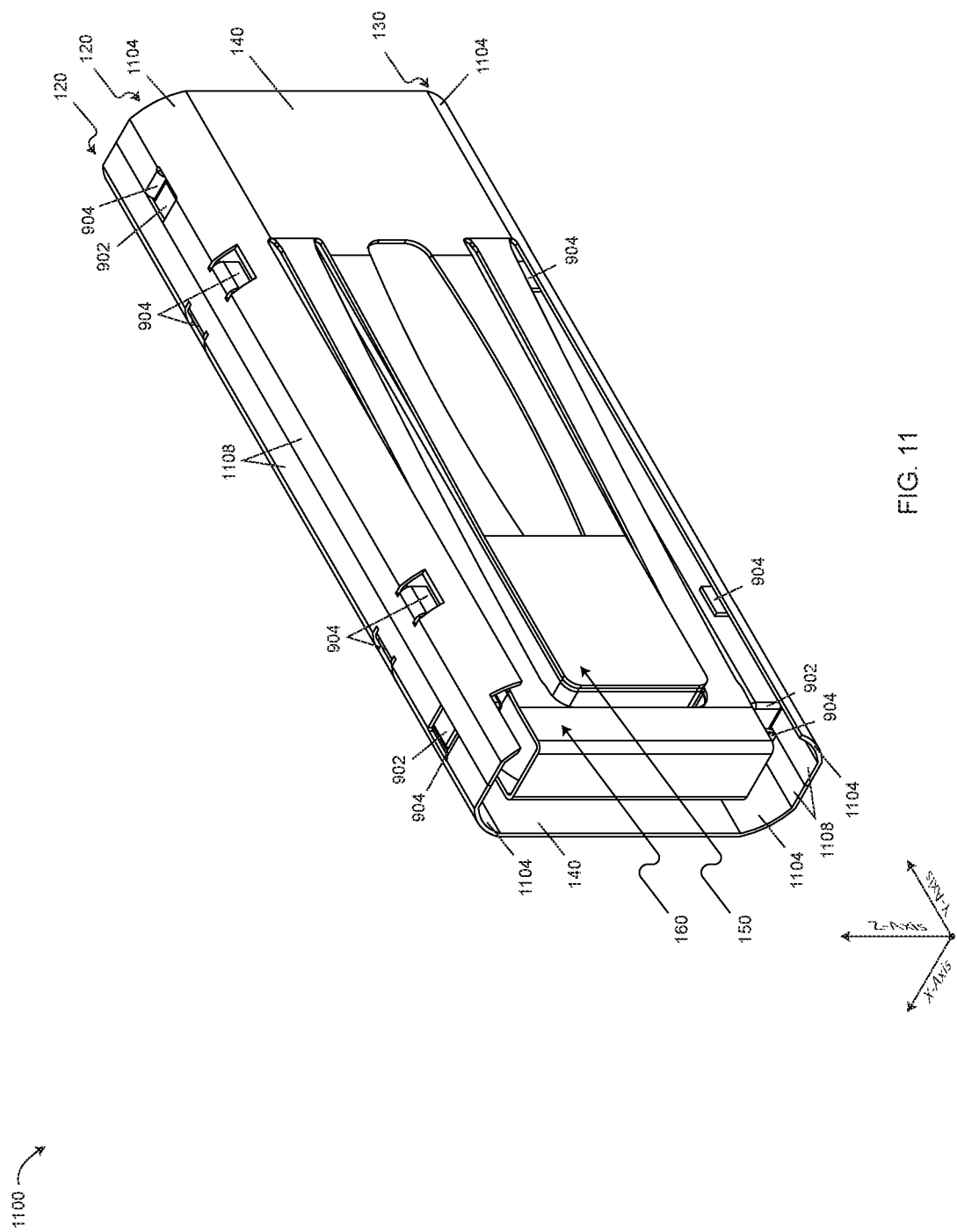
FIG. 11 illustrates the isometric view of a compact vibrating actuator in yet another embodiment.
Figure 12:
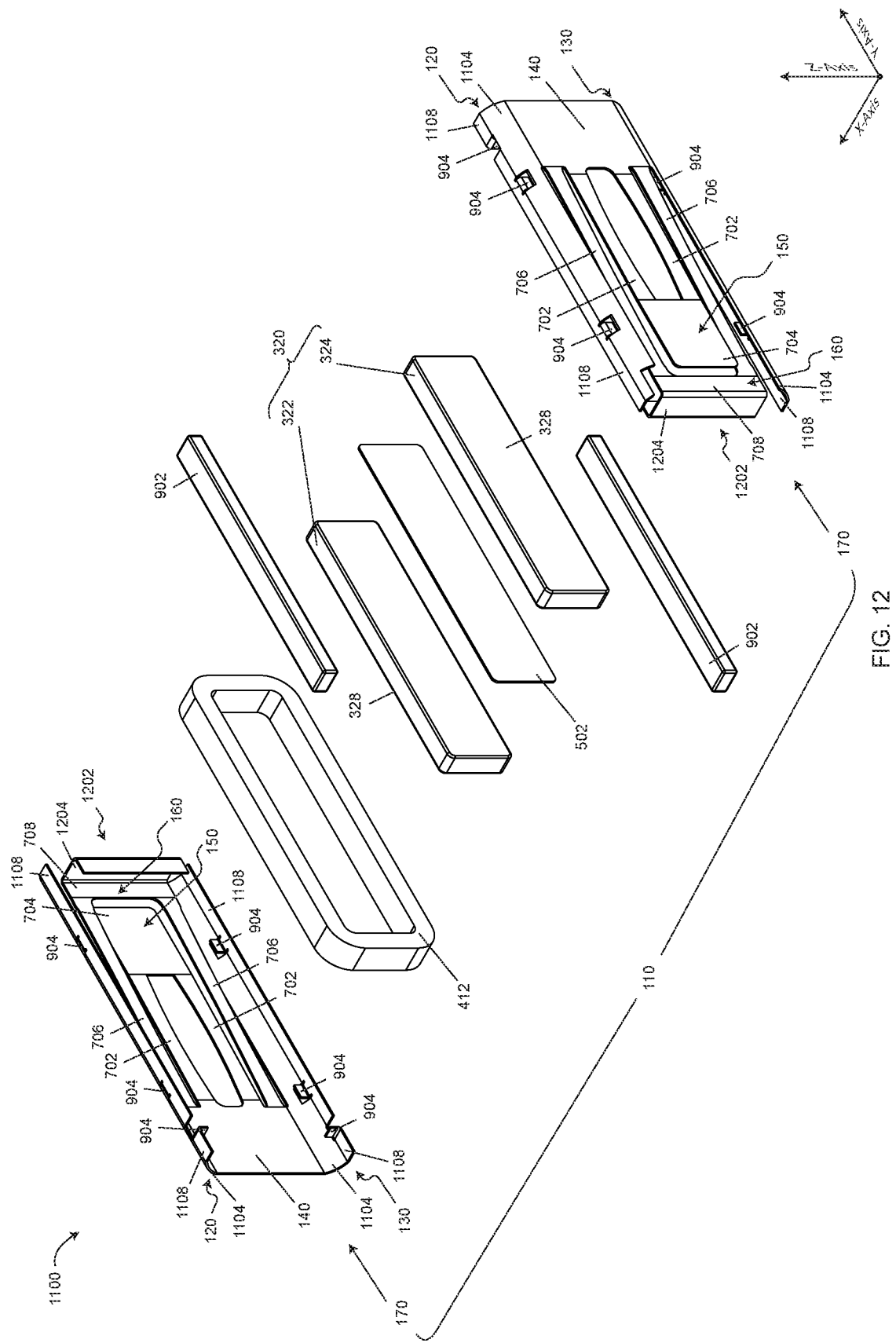
FIG. 12 shows an isometric exploded view of the compact vibrating actuator in yet another embodiment.

FIG. 11 illustrates an isometric view and FIG. 12 illustrates an exploded isometric view of the vibrating actuator 1100. In this embodiment, a vibrating actuator 1100 includes the chassis 110 comprising two parts 170. The parts 170 of the chassis 110 include the upper plate 120 and the lower plate 130. The upper plate 120 and the lower plate 130 are substantially smaller in length compared to the lateral plate 140. The upper plate 120 and the lower plate 130 are similar in size, shape and dimension and form a mirror image of each other along the X-Y-plane. Furthermore, each upper plate 120 and the lower plate 130 is formed by a curved section 1104 and a rectangular section 1108. In an alternate embodiment, the upper plate 120 and the lower plate 130 may vary in size, shape and dimensions.

Attachment means 904 are provided on each of the upper plate 120 and the lower plate 130 for affixing the guiding magnets 902. The attachment means 904 are located at the intersection of the curved section 1104 and the rectangular section 1108. The attachment means 904 are tabs, which hold the guiding magnets 902 in the right position and orientation. In other variations, the attachment means 904 can be clips, holding brackets, etc. that can be attached or fabricated in the upper plate 120 and the lower plate 130 for affixing the guiding magnets 904.

The lateral plate 140 has two U-shaped projections, which form the first elastic member 150 and the second elastic member 160. The first elastic member 150 is surrounded by the second elastic member 160 on three sides, while the fourth side of the first elastic member 150 and the second elastic member 160 terminate into the lateral plate 140 as shown in FIG. 11. Additionally, the first elastic member 150 and the second elastic member 160 can vibrate independently of each other and are disposed such that there is a gap between the first elastic member 150 and the second elastic member 160.

The Y-Z-plane of the lateral plate 140 and the Y-Z-plane of the rectangular plate 704 of the first elastic member 150 are parallel to each other. The rectangular plate 704 is displaced towards the center of the vibrating actuator 1100 in the longitudinal axis (X-axis) compared to the lateral plate 140 by a distance, for example of 0.2 mm to 2 mm. The two legs 702 of the first elastic member 150 connect the lateral plate 140 with the rectangular plate 704 at an angle creating an inclination between the lateral plate 140 and rectangular plate 704. Likewise, the Y-Z-plane of the lateral plate 140 and the Y-Z-plane of the rectangular plate 708 of the second elastic member 160 are parallel to each other. The rectangular plate 708 is displaced towards the center of the vibrating actuator 1100 in the longitudinal axis (X-axis) compared to the lateral plate 140 by a distance, for example between 0.2 mm to 2 mm. The two legs 706 of the second elastic member 160 connect the lateral plate 140 with the rectangular plate 708 at an angle creating an inclination between the lateral plate 140 and rectangular plate 708.

Further, in this variation, from the second elastic member 160 protrudes a L-shaped structure 1204 towards the longitudinal center of the vibrating actuator 1100, from the edge of the rectangular plate 708, which is opposite to the two legs 706 to form a holder 1202. The holder 1202 on the the second elastic member 160 provides an innovative way to hold the coils 410 or a single coil 412 in the right position during vibration. In this embodiment, the holder 1202 is U-shaped.

The first moving part 210 includes the arrangement of magnets 320, which is formed by the first magnet 322 and the second magnet 324 with like poles facing each other. Additionally, the spacer 502 of non-magnetic material is placed in between the first magnet 322 and the second magnet 324. The first magnet 322, the spacer 502 and the second magnet 324 are glued together to form the first moving part 210. The spacer 502 reduces the size of the first magnet 322 and the second magnet 324, which is an efficient way of reducing cost of the magnets, which are rare earth metals and therefore expensive. Alternatively, the spacer 502 can be omitted and the magnets are glued directly together.

In this embodiment, the second moving part 220 comprises only one coil 412 without any U-shaped brackets 420. The arrangement of magnets 320 is inserted into the coil 412, the coil is placed inside the holder 1202 of the second elastic members 160 on each of the two parts 170 of the chassis 110 and secured with a binding material. Furthermore, the rectangular plate 704 of the first elastic member 150 of each of two parts 170 of the chassis 110 is attached to the first moving part 210, that is, the arrangement of magnets 320, such that the first elastic member 150 faces the outer poles 328. Furthermore, each of the two parts 170 of the chassis 110 is assembled such that the first elastic member 150, the second elastic member 160 and the lateral plate 140 face diagonally opposite to each other.

The two guiding magnets 902 are attached on the inside of the upper plates 120 and the lower plates 130 of the two parts 170 of the chassis 110 such that the two guiding magnets 902 are opposite to each other and the transversal center line of each of the guiding magnets 902 longitudinally coincides with the transversal intersection line of the first magnet 322 and the second magnet 324 of the arrangement of magnets 320. The guiding magnets 902 and the arrangement of magnets 320 are oriented such that their opposite poles face each other. For example, if the north pole of the first magnet 322 and the north pole of the second magnet 324 face each other, then the south pole of the guiding magnets 902 are placed directly above the north poles of the arrangement of magnets 320.

In this embodiment, the first moving part 210 comprises the arrangement of magnets 320, having the first magnet 322 and the second second magnet 324. The second moving part 220 comprises the coil 412. However, in other embodiments, the arrangement of magnets 320 of the first moving part 210 can comprise more than two magnets and the second moving part 220 can comprise coils 410 as shown in FIG. 5B-5C.

When the coils 410 are energised by an alternating electric current, the alternating current interacts with the permanent magnetic field of the arrangement of magnets 320 to produce two opposing forces according to the Lorentz Force principle. Initially, at rest, the two opposing forces move the first moving part 210 and the second moving part 220 in opposite directions. When the alternating current is reversed in the coils 410, the alternating current interacts with the permanent magnetic field of the arrangement of magnets 320 to produce two opposing forces in the reverse direction. The first moving part 210 is constrained by the first elastic members 150 and produces a recoil due to elasticity. When the recoil energy stored in the first elastic members 150 is released, it aids the movement of the first moving part 210 thereby producing vibratory motion. Similarly, the second moving part 220 is constrained by the second elastic member 160 and produces a recoil due to elasticity. When the recoil energy stored in the second elastic members 160 is released it aids the movement of the second moving part 220 thereby producing vibratory motion.

The resonance frequency of the first moving part 210 depends upon at least the mass of the frame 310, the mass of the arrangement of magnets 320, and the elastic constant of the first elastic members 150. In an alternate implementation, when the first moving part 210 is without frame 310, the resonance frequency of the first moving part 210 depends upon at least the mass of the arrangement of magnets 320 and the elastic constant of the first elastic members 150. Likewise, the resonance frequency of the second moving part 220 depends upon at least the mass of the U-shaped brackets 420, the mass of the coils 410, and the elastic constant of the second elastic member 160. In an alternate implementation, when the second moving part 220 includes only the coils 410, the resonance frequency of the second moving part 220 depends upon at least the mass of the coils 410 and the elastic constant of the second elastic member 160. Finally, the first moving part 210 produces a linear oscillatory movement in the longitudinal direction (X-axis) with resonance frequency F1 and the second moving part 220 produces a linear oscillatory movement in the longitudinal direction (X-axis) with resonance frequency F2. The first resonance frequency F1 and the second resonance frequency F2 are different and far apart. For example, the first resonance frequency F1 can be 40 Hz and the second resonance frequency F2 can be 75 Hz.

A directed magnetic field is generated by the arrangement of magnets 320 embedded inside the frame 310 with like poles facing each other. The magnetic field flows radially outwards (for example, outwards transversally (Y-axis)) from the arrangement of magnets 320, at the intersection point of the arrangement of magnets 320, where the north poles of the arrangement of magnets 320 face each other, and transverses the coils 410. Additionally, guiding magnets 902 can be utilised to further direct the magnetic field lines at an angle that is perpendicular or almost perpendicular to the coils. Furthermore, the magnetic field flows inwards (for example, inward transversally (Y-axis)), transverses the coils 410 and into the arrangement of magnets 320, at the intersection point of the arrangement of magnets 320, where south poles of the arrangement of magnets 320 face each other. When the coils 410 are energized by passing the alternating current in the presence of the directed magnetic field, a force is produced on the second moving part 220 according to the Lorentz Force principle; accordingly, the first moving part 210 experiences a force in the opposite direction. Further, the first coil 412 and the second coil 414 are wound in opposite directions, so that when the current flows through the coils 410, the second moving part 220 experiences a force unilaterally in one direction. When the alternating current is reversed, the second moving part 220 experiences a force in the opposite direction. This phenomenon creates vibratory motion in the second moving part 220. Likewise, the first moving part 210 also experiences a force according to the Lorentz Force principle that produces a second vibratory motion independent of the first vibratory motion. The motion of the first moving part 210 is relative to the second moving part 220 and can be in the same direction or in the opposite direction.

The vibrating actuators described herein are exemplary only. Other configurations and variations provided herein are non-limiting and any modifications fall within the scope of the invention. The functionality and use of the vibrating actuator are for illustrative purposes and are not intended to be limiting in any manner. Other uses of vibrating actuators such use in medical devices, automobile dashboard or other areas having tactile feedback are well within the scope. Furthermore, the different components of the vibrating actuator can be suitably modified to provide additional functionality as demonstrated in different embodiments.

The invention claimed is:

1. A vibrating actuator having two different resonant frequencies, the vibrating actuator comprising:
    a first moving part having an arrangement of magnets comprising at least two magnets, wherein the like poles of the magnets face each other and wherein the arrangement of magnets has two outer poles;
    a second moving part having at least one coil such that the coil is wound over the arrangement of magnets;
    a chassis formed by two parts, such that each part has a first elastic member and a second elastic member, wherein each of the first elastic member and the second elastic member face one of the two outer poles, and
    the first moving part is attached to the first elastic member and the second moving part is attached to the second elastic member, wherein:
        the first moving part has a first resonant frequency, based on a mass of the first moving part and an elastic constant of the first elastic member, and the second moving part has a second resonant frequency, based on a mass of the second moving part and an elastic constant of the second elastic member, such that the vibrating actuator is configured to operate with two substantially different resonant frequencies.

2. The vibrating actuator of claim 1, wherein the two parts are configured to mate with each other to form a rectangular parallelepiped structure.

3. The vibrating actuator of claim 1, wherein the first elastic member is surrounded by the second elastic member on three sides and further the first elastic member and the second elastic member form part of the lateral plate on the fourth side.

4. The vibrating actuator of claim 1, wherein a spacer is provided in between adjacent magnets.

5. The vibrating actuator of claim 4, wherein the spacer is a non-magnetic material or paramagnetic material.

6. The vibrating actuator of claim 1, wherein the second elastic member has a L-shaped structure which is attached to a rectangular plate to form a holder.

7. The vibrating actuator of claim 6, wherein the holder has a provision for inserting and attaching the second moving part.

8. The vibrating actuator of claim 1, wherein the first elastic member and the second elastic member are U-shaped.

9. The vibrating actuator of claim 8, wherein the U-shaped first elastic member has two legs having transversal indentations on either an inner edge or an outer edge or both the inner edge and the outer edge.

10. The vibrating actuator of claim 8, wherein the U-shaped second elastic member has two legs having transversal indentations on either an inner edge or an outer edge or both the inner edge and the outer edge.

11. The vibrating actuator of claim 1, wherein the first moving part has an arrangement of magnets comprising three magnets with like poles of the adjacent magnets facing each other.

12. The vibrating actuator of claim 11, wherein the arrangement of magnets comprises three magnets with a spacer placed in between adjacent magnets.

13. The vibrating actuator of claim 12, wherein the spacer is a non-magnetic material or paramagnetic material.

14. The vibrating actuator of claim 1, wherein the two parts are U-shaped.

15. The vibrating actuator of claim 14, wherein each of the two parts includes an upper plate, a lower plate, and a lateral plate.

16. The vibrating actuator of claim 15, wherein the arrangement of magnets comprises two magnets and wherein each of the two parts further includes an attachment means for affixing guiding magnets, which are placed on the upper plate and the lower plate such that a transversal center line of each of the guiding magnets is longitudinally aligned with a transversal intersection line between the two magnets.

17. The vibrating actuator of claim 16, wherein the attachment means are tabs.

18. A method for manufacturing a vibrating actuator, comprising the following steps:
    assembling a first moving part having an arrangement of magnets comprising at least two magnets, wherein the like poles of the magnets face each other and wherein the arrangement of magnets has two outer poles;
    assembling a second moving part having at least one coil such that the coil is wound over the arrangement of at least two magnets;
    assembling a chassis formed by two parts, such that each part of the chassis has a first elastic member and a second elastic member, wherein each of the first elastic member and the second elastic member face one of the two outer poles, wherein:
        the first moving part has a first resonant frequency, based on a mass of the first moving part and an elastic constant of the first elastic member, and the second moving part has a second resonant frequency, based on a mass of the second moving part and an elastic constant of the second elastic member, such that the vibrating actuator is configured to operate with two substantially different resonant frequencies; and attaching the first elastic member to the first moving part and attaching the second elastic member to the second moving part.

* * * * *